United States Patent
Kempfle et al.

(10) Patent No.: US 12,435,919 B2
(45) Date of Patent: Oct. 7, 2025

(54) HOUSEHOLD REFRIGERATION APPLIANCE HAVING IMAGE RECORDING MODULES AND METHOD OF RECORDING IMAGES IN A HOUSEHOLD REFRIGERATION APPLIANCE

(71) Applicant: BSH Hausgeräte GmbH, Munich (DE)

(72) Inventors: Stephan Kempfle, Ellzee (DE);
Christopher Rodney, Villenbach (DE);
Daniel Bihr, Kirchheim am Ries (DE);
Joachim Schäferling, Bissingen (DE)

(73) Assignee: BSH Hausgeräte GmbH, Munich (DE)

( * ) Notice: Subject to any disclaimer, the term of this patent is extended or adjusted under 35 U.S.C. 154(b) by 402 days.

(21) Appl. No.: 18/084,747

(22) Filed: Dec. 20, 2022

(65) Prior Publication Data

US 2023/0194148 A1 Jun. 22, 2023

(30) Foreign Application Priority Data

Dec. 20, 2021 (DE) ...................... 10 2021 214 690.2

(51) Int. Cl.
*F25D 25/02* (2006.01)
*F25D 23/02* (2006.01)
*H04N 23/56* (2023.01)

(52) U.S. Cl.
CPC ......... *F25D 23/028* (2013.01); *F25D 25/025* (2013.01); *H04N 23/56* (2023.01); *F25D 2400/36* (2013.01); *F25D 2700/02* (2013.01)

(58) Field of Classification Search
CPC .................................. F25B 31/004; F25B 7/00
See application file for complete search history.

(56) References Cited

U.S. PATENT DOCUMENTS

| | | | |
|---|---|---|---|
| 11,156,970 | B2 | 10/2021 | Abdoo et al. |
| 2009/0251543 | A1* | 10/2009 | Kogane .................. H04N 7/188 348/152 |
| 2015/0059374 | A1* | 3/2015 | Hebel ..................... F25D 29/00 62/331 |
| 2018/0239319 | A1* | 8/2018 | Abdoo ................... G05B 15/02 |
| 2020/0158417 | A1 | 5/2020 | Bechtle et al. |
| 2022/0147042 | A1* | 5/2022 | Trank .................. H04L 65/1108 |

FOREIGN PATENT DOCUMENTS

| | | |
|---|---|---|
| DE | 102017213425 A1 | 2/2019 |
| EP | 3527918 A2 | 8/2019 |
| WO | 2018142136 A1 | 8/2018 |

* cited by examiner

*Primary Examiner* — Nael N Babaa
(74) *Attorney, Agent, or Firm* — Laurence A. Greenberg; Werner H. Stemer; Ralph E. Locher

(57) ABSTRACT

A household refrigeration appliance, in particular a refrigerator or a French-door refrigerator, includes a plurality of image recording modules each having at least one camera sensor. A control unit is connected to the image recording modules. The control unit is configured to output a trigger signal to at least one of the image recording modules, and the at least one image recording module is configured to record at least one image by using at least one camera sensor upon receiving the trigger signal and to transmit corresponding image data to the control unit. A method for recording images of refrigerated goods stored in a household refrigeration appliance is also provided.

13 Claims, 12 Drawing Sheets

HOUSEHOLD REFRIGERATION APPLIANCE HAVING IMAGE RECORDING MODULES AND METHOD OF RECORDING IMAGES IN A HOUSEHOLD REFRIGERATION APPLIANCE

CROSS-REFERENCE TO RELATED APPLICATION

This application claims the priority, under 35 U.S.C. § 119, of German Patent Application DE 10 2021 214 690.2, filed Dec. 20, 2021; the prior application is herewith incorporated by reference in its entirety.

FIELD AND BACKGROUND OF THE INVENTION

The invention relates to a household refrigeration appliance, including a plurality of image recording modules each having at least one camera sensor, as well as a control unit connected to the image recording modules. The invention further relates to a method for recording images of refrigerated goods stored in a household refrigeration appliance. The invention can be applied particularly advantageously to refrigerators, specifically refrigerators with double doors in a French-door arrangement.

European Patent Application EP 3 527 918 A2, corresponding to U.S. Pat. No. 11,156,970, discloses a refrigeration appliance including a system which captures and analyzes consecutive inputs of data and compares the captured data or parts of the data in order to provide the user of the appliance with an indication as to the status of the household stock level of various consumer products. The system can include a scanning apparatus with one or several cameras. The camera(s) can register the content of the cooling compartment, such as for example that at least one temporarily stored item is disposed in one or several of a multiplicity of storage areas. The camera(s) can also register the content of at least one of the one or several temporarily stored items.

International Publication WO 2018/142136 A1 discloses an imaging apparatus for mapping a scene, including an imaging device which can be mounted on a structure which is movable relative to a scene to be mapped; a motion sensor which is configured to output motion data indicating a movement of the imaging device; a position sensor which is configured to output position data indicating the position of the imaging device relative to the scene; and a processor which is configured to receive the motion data from the motion sensor and as a response thereto choose between a high-power mode and a low-power mode of the imaging device and/or of the position sensor, wherein more power is consumed in the high-power mode than in the low-power mode. In one example, the imaging apparatus is part of a refrigerator, wherein the camera can be mounted on the door of the refrigerator. The camera is then capable of recording images of the content of the refrigerator.

German Patent Application DE 10 2017 213 425 A1, corresponding to U.S. Publication No. 2020/0158417, discloses a household refrigeration appliance including a swinging door to which a sensor apparatus can be attached. The sensor apparatus includes an inertial sensor for providing a motion signal; and a processing facility which is configured to determine a pivot angle of the swing door on the basis of the motion signal and to output a signal once the pivot angle has reached a predetermined threshold value. The processing facility is preferably configured to determine that the swing door is fully closed and to calibrate the determined pivot angle. The inertial sensor, particularly if it is configured as a microelectromechanical sensor, usually has a limited long-term stability. If the sensor is operated over an extended period, a drift can accumulate in such a way that a movement of the swing door could be determined erroneously. Such an error can be compensated by occasional calibration. The determined pivot angle can in particular be set to zero when the swing door is fully closed. In this way, it can be achieved that the pivot angle corresponds to an opening angle of the swing door.

SUMMARY OF THE INVENTION

It is accordingly an object of the invention to provide a household refrigeration appliance having image recording modules and a method of recording images in a household refrigeration appliance, which at least partially overcomes the hereinafore-mentioned disadvantages of the heretofore-known appliances and methods of this general type and which is particularly cost-efficient, can be implemented in a flexible manner and can be operated in an energy-saving manner.

With the foregoing and other objects in view there is provided, in accordance with the invention, a household refrigeration appliance, including a plurality of image recording modules each having at least one camera sensor, and a control unit connected to the image recording modules, wherein the control unit is configured to output a trigger signal to at least one of the image recording modules, and the at least one image recording module is configured to record at least one image by using at least one camera sensor upon receiving the trigger signal and to transmit the corresponding image data to the control unit.

Preferred embodiments may be derived in particular from the dependent claims.

This household refrigeration appliance has the advantage that the image recording modules can be controlled by the control unit and for this reason can themselves be manufactured in a particularly cost-efficient manner. In addition, the number of image recording modules is easily scalable, enabling a flexible configuration. Furthermore, the recording of images of refrigerated goods stored in the refrigeration appliance (for example in the cooling chamber, in drawers with a special climate, and/or in the at least one door) can be adapted by the control unit in a particularly targeted manner to situations in which the refrigerated goods are particularly readily visible. Moreover, by coordination by the control unit, functional components of the image recording system can be deactivated in a targeted manner if they are not being used, thereby reducing power consumption.

The household refrigeration appliance can be for example a refrigerator, a freezer compartment or a combination thereof.

In one development, a cooling chamber of the household refrigeration appliance can be closed off by a single door. In one development, a cooling chamber of the household refrigeration appliance can be closed off by several, in particular two, doors. If the cooling chamber can be closed off by two doors, these can be present in particular in a so-called French-door arrangement.

An image recording module is configured (in other words embodied and disposed) to record at least one image, possibly also a video, of refrigerated goods stored in the household refrigeration appliance, for example from a cooling chamber, a drawer, a door compartment, etc. The image recording module can also be referred to as a CiF ("camera-in-fridge") module. The image recording modules are therefore in particular not provided to record images in a targeted manner from the surroundings of the refrigeration appliance.

The camera sensor is in particular a digital camera sensor, for example a color digital sensor. The camera sensor can have a CMOS sensor element or a CCD sensor element. An optical element, for example a lens etc., can be assigned to the camera sensor. In one development, the camera sensor is a so-called "global shutter" camera sensor. It can however also be a so-called "rolling shutter" camera sensor. In one development, the camera sensor generates images with an image size of approximately 1 megapixel. In one development, the camera sensor has a horizontal field of view (FoV) of approximately 100°. In one development, the camera sensor has a vertical field of view (FoV) of approximately 60°.

The trigger signal is an electrical signal which is provided to trigger an image recording when applied to the camera sensor. In particular, the camera sensor is advantageously embodied for low energy consumption in such a way that it is in a power-saving mode if no trigger signal is applied to it. If a trigger signal is applied, the camera sensor wakes up from the power-saving mode and records at least one image. If the trigger signal is deactivated again, the camera sensor automatically returns to the power-saving mode.

The control unit can have a microprocessor, ASIC, FPGA, etc. In one development, the control unit is able to be connected to up to four image recording modules, although it does not have to be connected.

In one embodiment, the image recording modules have at least one ("door") image recording module disposed on a door and at least one ("body or carcass") image recording module disposed on a body or carcass. Refrigerated goods—stored on shelves for example—in the cooling chamber can be captured particularly well by a door image recording module. Refrigerated goods located in front of the shelves, for example refrigerated goods placed in a door, refrigerated goods stored in a drawer, etc., can be captured particularly well by a body or carcass image recording module.

In one development, when the cooling chamber can be closed off by a single door, the door has one or several door image recording modules. In one development, when the cooling chamber can be closed off by several doors, each of the doors has one or several door image recording modules.

In one embodiment, at least the door image recording module has a gyrosensor. This achieves the advantage that an angular velocity $\Omega z$ of the door, a pivot angle $\alpha$ and/or a direction of rotation of the door can be determined and used to generate a trigger signal, without a special gyromodule. A pivot angle $\alpha=0°$ corresponds to a closed door. Specifically, if the pivot angle $\alpha$ is assumed during a closing or during a closing movement of the door, it can also be referred to as the "door closing angle." A gyrosensor can in principle output a trigger signal at one or several trigger angles. In this case, the trigger signal can be identical or trigger signals associated with at least two different trigger angles can be differentiated, for example because they are output at different terminals.

Apart from the physical gyrometric element, the gyrosensor can have a data processing facility, for example in order to determine a pivot angle from measured angular velocities, to store trigger angles, to output trigger signals, etc. To this end, the gyrosensor can be equipped with corresponding driver software.

In one embodiment, the door image recording module is configured to output a ("first") trigger signal to its at least one camera sensor when at least one first trigger angle determined by using the gyrosensor is reached in order to record at least one image. This first trigger signal can also be referred to as the "self-trigger." This embodiment causes the door image recording module to automatically record at least one image when the trigger angle is reached (possibly under the further condition that a door closing process is taking place or the trigger angle is reached as the door is being closed). In one development, the door image recording module is configured to transmit the image data associated with the at least one recorded image to the control unit.

In one development which is advantageous in particular for refrigeration appliances with several door image recording modules, the door image recording module is configured to transmit the first trigger signal additionally to the control unit. This produces the advantage that the control unit can thereby be informed of the door image recording module from which the image data originates.

In one embodiment, the door image recording module is configured to transmit a second trigger signal to the control unit when at least one second trigger angle determined by using the gyrosensor is reached by the associated door (possibly under the further condition that a door closing process is taking place or the trigger angle is reached as the door is being closed), and the control unit is configured to transmit the second trigger signal to at least one other image recording module, in particular to one of the one or several body image recording modules. In this way, the advantage is achieved that a door movement can also be used to trigger other, in particular stationary, image recording modules to record at least one image. The second trigger angle can be selected in such a way that a particularly good (for example complete, readily visible, readily illuminable, etc.) capture of the refrigerated goods in an image of the other image recording module is achieved.

In one development, the second trigger angle corresponds to the first trigger angle. In one development, the second trigger angle differs from the first trigger angle. In one development, the first and the second trigger angle differ to such an extent that an image transmission of the image data of the image first recorded is complete before an image transmission of the image data of the image next recorded begins.

In one embodiment, at least one body image recording module, to which the second trigger signal can be transmitted, is configured to record at least one image of an inner side of the at least one door. In this way, the advantage is achieved that, with a closing process of the door, at least one image from the cooling chamber is recorded by the associated door image recording module and at least one image of the at least one door is recorded by at least one body image recording module. This advantageously makes it possible to capture refrigerated goods stored in the cooling chamber and in storage compartments of the door, which in turn is advantageous for as complete as possible an object capture of the refrigerated goods and a reliable automated storage.

In one embodiment, the household refrigeration appliance has at least one drawer, accommodated in a cooling chamber, to which at least one sensor, in particular proximity sensor, connected to the control unit is assigned, the control unit being configured to determine from sensor data of the sensor whether the at least one drawer is being pushed in and whether it is still open by a predetermined distance and, if this is the case, the control unit being configured to output a trigger signal to at least one body image recording module, which is configured to record at least one image from the at least one open drawer. This body image recording module is not triggered to record an image by a door image recording module, but instead only by the control unit on the basis of an evaluation of a movement of the drawer.

Where there are several, in particular two, drawers disposed side by side, in one advantageous development the body image recording module provided to record images from a drawer is configured to record the open regions of all drawers. The open regions of all drawers therefore lie in the field of view of this body image recording module.

In order to record images from an open drawer and/or to record images of an inner side of the at least one door, the body image recording module provided for this purpose is advantageously located on a ceiling of the cooling chamber. In order to record images from an open drawer, the body image recording module provided for this purpose is located in particular in front of front edges of shelves, as the associated camera sensor then gains a direct view from above into the open region of the at least one drawer.

The location of the at least one body image recording module is not limited to the ceiling, however. Alternatively or in addition to a ceiling arrangement, at least one body image recording module can be disposed for example on a side wall of the cooling chamber. This can be advantageous for example in order to record images from a lower-lying region of the cooling chamber. In general, at least one body image recording module can therefore also be configured to record images from the cooling chamber.

In one embodiment, the household refrigeration appliance has at least one door opening sensor which is connected to the control unit. In this way, the advantage is achieved that a closing state of the at least one door can be established particularly reliably and also independently of the gyrosensors. This can be used for example to set or reset the pivot angle α=0° of the gyrosensor disposed on this door.

In one embodiment, the control unit is configured to deactivate at least one body image recording module when the at least one door is closed. In this way, energy for operating the at least one body image recording module can be deactivated. If the refrigeration appliance has several doors, all doors must advantageously be closed before the at least one body image recording module is deactivated. In one development, the deactivation is achieved by deenergizing the modules.

In one embodiment, the image recording modules are advantageously connected to the control unit via a respective FPD ("flat panel display") link, in particular via an FPD-Link III. FPD Link III advantageously makes it possible to embed a bidirectional communication channel into the same differential pair. In addition to clock signals and data (for example image data), the bidirectional communication channel can also transmit control signals between source and target. For this reason, FPD Link III reduces the cable costs by it being possible to dispense with special cables for control channels such as I2C and CAN bus. The control channel of FPD-Link III can use the I2C bus protocol between source and target, but is not limited thereto. FPD-Link III is effectively transparent for communication between source and target. In this way, image processing units can control and configure cameras via the same cable as for data transmission. In addition, FPD-Link III uses only CML ("current mode logic") for the serialized high-speed signals. As a result, it can work smoothly with data rates of more than 3 Gbit/s on cables with a length of more than 10 m. An additional advantage of FPD Link III is the possibility to integrate an adaptive equalization in the deserializer.

A serial digital video interface analogous to the FPD Link III connection is represented by the GMSL connection ("gigabit multimedia serial link"). Analogously to the FPD-Link III connection, the GMSL connection enables a bidirectional communication channel for a wide range of interface formats and the transport of high-resolution digital video data with high bandwidths in complex circuits via a cost-efficient cable and connection distances of up to 15 meters or, depending on the requirements, even over longer connection distances.

In one development, the image recording modules in each case have a serializer, which is configured to serialize at least image data to be transmitted to the control unit, and the control unit has a deserializer, which is configured to deserialize at least image data transmitted by the image recording modules.

In one embodiment, the household refrigeration appliance has at least one door opening sensor per door, which door opening sensor is connected to the control unit. As a result, the opening state (open/closed) of the at least one door can advantageously be established particularly reliably and also independently of gyrosensors.

In one embodiment, the control unit is configured to transmit the opening state of the at least one door to the at least one door image recording module, and the door image recording module is configured to deactivate the associated serializer when the at least one door is closed and the gyrosensor has determined that the associated door is at least substantially at rest. In this way, the energy consumption of the serializer can be reduced when it is not needed. Where there are several doors, in one advantageous development the door image recording module, in particular its gyrosensor, is configured to deactivate the associated serializer when at least the associated door is closed. Where there are several doors, in one advantageous development the door image recording module, in particular its gyrosensor, is configured to deactivate the associated serializer when all doors are closed. In one development, the gyrosensor is configured to optionally activate and deactivate the associated serializer.

In one embodiment, the door image recording module, in particular its gyrosensor, is configured to activate the associated serializer, the serializer having previously been deactivated, when the gyrosensor establishes a perceptible movement of the associated door. This produces the advantage that the serializer is operationally ready in a timely manner to transmit data and signals from the door image recording module to the control unit, for example trigger signals, image data etc. The gyrosensor of the door image recording module is therefore in particular "always on."

In one embodiment, the image recording modules are connected to the control unit via a respective coaxial cable. Because coaxial cables are very good at controlling impedance and noise, they reduce the need for differential signaling, which tolerates impedance discontinuities and noise interference particularly well. The additional advantage of the good coaxial cable driver capability of the individual conductor is achieved by the CML technology in conjunction with an FPD-Link III. Via the coaxial cable, a bidirectional data transmission and a voltage supply (known as PoC; "Power-over-Coax") of the respective image recording module can be implemented.

In one embodiment, the image recording modules have in each case a camera module, which includes the camera sensor, and a connection module, which includes the serializer, and the camera module is connected to the connection module via an FPC connector. In this way, a flexible laying and installation of the image recording module can be achieved. In particular, it is also possible in this way to provide an image recording module, specifically a door image recording module, which has an elongated shape with the camera module at its tip, which can easily be laid and connected.

In one embodiment, the connection module also includes the gyrosensor. In this way, a particularly compact and inexpensive configuration is achieved.

In one embodiment, the camera module also includes a flash. In this way, a particularly effective illumination of the field of view of the camera sensor is enabled. In particular, the time at which the flash is triggered can be coordinated with the time at which an image is recorded. In one development, the flash includes at least one LED.

In one development, the camera module has at least one heating element in order to avoid a misting of the camera sensor or of a window located in front of the camera sensor.

In one development, the image recording modules have identically configured connection modules and camera modules. This use of identical parts enables manufacturing costs to be reduced. In one development, the connection module of the at least one body imaging module also has a gyrosensor, which is however not used. This gyrosensor can be inactive, for example.

In one development, at least one door image recording module has a middle part with a tubular housing. A reinforcement part having a laterally tapering, plate-shaped base can be inserted into the rear end opening of the housing. The reinforcement part can be pushed through a simple opening in the door inner wall (which can also be referred to as the "door inner liner") into the cooling chamber until the base is fully supported on a side of the door inner wall facing away from the cooling chamber. In the installed state of the door image recording module, the door inner wall is then clamped in particular between the base and the rear wall of the tubular housing and the door image recording module is thus fastened and, due to the surface contact between the base and the door inner wall, is automatically aligned precisely with the door inner wall. The middle part protrudes or projects in particular on the inner or cooling chamber side vertically forward from the door inner wall. This development is advantageously particularly easy to implement and can be installed without a screwed connection, and can also be used on a cross-platform basis. Specifically, the reinforcement part can also be used in a standardized manner across different platforms.

In one development, a cap with an end face is placed on the front end of the housing, wherein the end face is angled in particular obliquely to the longitudinal orientation of the tubular housing and has a window for the camera sensor and optionally a window for the flash. The window for the camera sensor can be embodied as an optical element, for example as a lens. In one development, the camera module is accommodated in the cap and connected to the connection module via an FPC connector laid through the tubular housing. In one development, a signal transmission terminal is present at the rear opening of the housing.

With the objects of the invention in view, there is concomitantly provided a method for recording images of refrigerated goods stored in a household refrigeration appliance, wherein the household refrigeration appliance has a plurality of image recording modules each having at least one camera sensor, and a control unit connected to the image recording modules, in the method the control unit outputs a trigger signal to at least one of the image recording modules, and the at least one image recording module records at least one image by using at least one camera sensor upon receiving the trigger signal and transmits the corresponding image data to the control unit.

The method can be embodied in an analogous manner to the household refrigeration appliance and has the same advantages.

Other features which are considered as characteristic for the invention are set forth in the appended claims.

Although the invention is illustrated and described herein as embodied in a household refrigeration appliance having image recording modules and a method of recording images in a household refrigeration appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
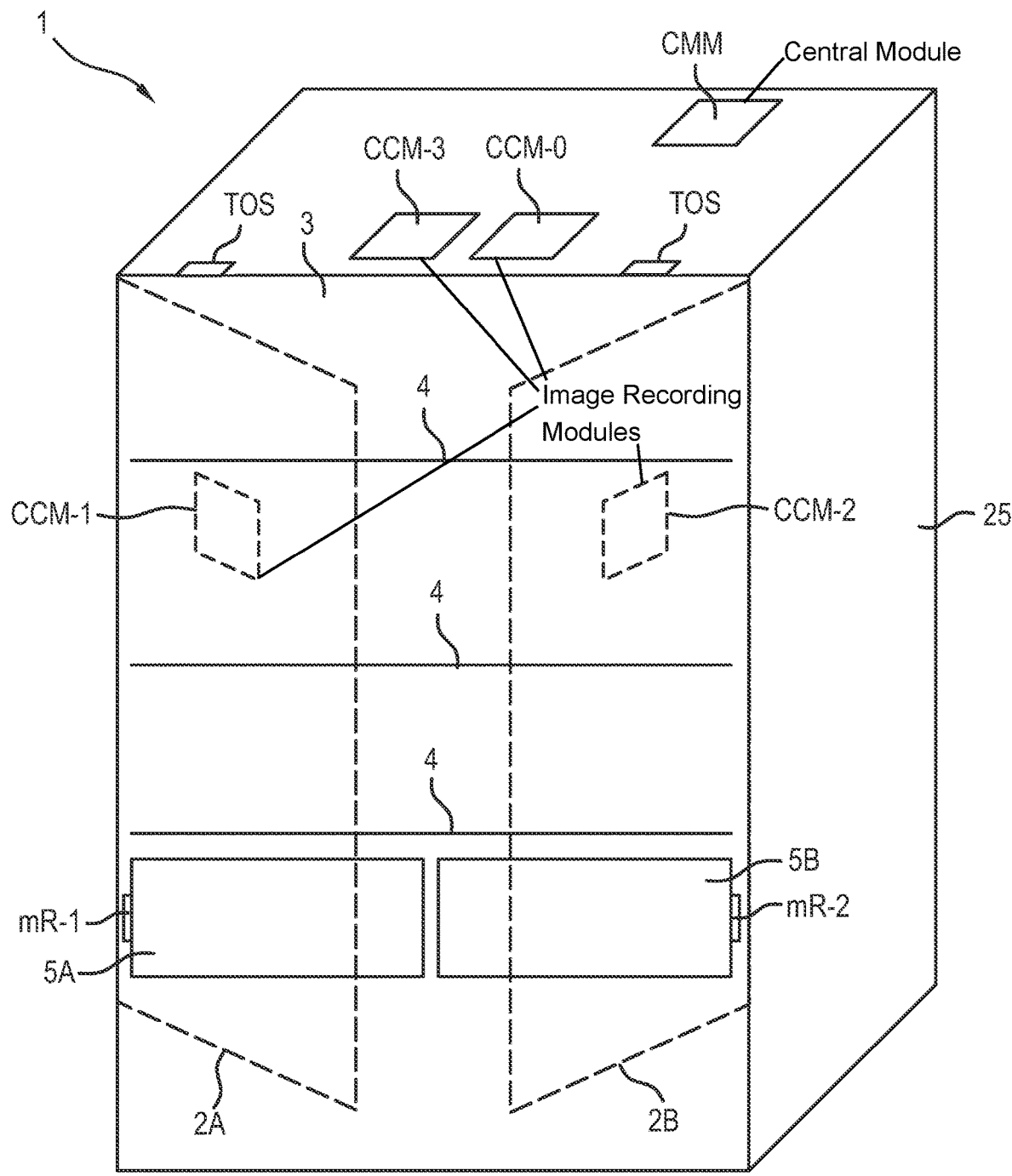
FIG. 1 is a diagrammatic, front-perspective view of a household refrigeration appliance in the form of a double-door refrigerator.

Referring now to the figures of the drawings in detail and first, particularly, to FIG. 1 thereof, there is seen a diagrammatic, front-perspective view of a household refrigeration appliance in the form of a double-door refrigerator 1 with two doors 2A and 2B attached to the outside of a body 25, which doors—viewed from the front—cover a left and a right side respectively of a common cooling chamber 3. This is also known as a "French-door" arrangement. The doors 2A and 2B are shown open herein.

The cooling chamber 3 contains several, in particular transparent, shelves 4 as well as a retractable drawer 5A and 5B on the bottom of the cooling chamber 3 on the left and right in each case, which drawer in particular provides a special climate zone, for example for fruit and vegetables ("VitaFresh"), meat and fish, etc. At least one sensor mR-1 or mR-2 is assigned to each of the two drawers 5A and 5B, through the use of which it is possible to detect when a drawer 5A, 5B is being or has been pulled out and when it is pushed back in. The sensors mR-1 and mR-2 can be proximity sensors such as for example magnet sensors, which detect an approaching sensing element, for example a magnet, attached to the respective drawer 5A, 5B. The sensors mR-1 and mR-2 are connected via data technology to a further module (referred to in the following without limiting the generality as the "central module" CMM), which can be accommodated for example in a switch space of the refrigerator 1 disposed for example above the cooling chamber 3.

The central module CMM is also connected via data technology to four image recording modules CCM-0, CCM-1, CCM-2, CCM-3, namely:
- to a first image recording module CCM-0, which is disposed on a ceiling of the cooling chamber 3 and is provided (in other words configured and disposed) to record at least one image of refrigerated goods placed in door compartments 17 on the inner sides of the doors 2A and 2B; —
- to a second image recording module CCM-1, which is disposed on an inner side of the left door 2A and is provided to record at least one image of refrigerated goods placed on the shelves 4, namely at least from a "left" spatial region of the cooling chamber 3 which is located behind the left door 2A when this door is closed;
- to a third image recording module CCM-2, which is disposed on an inner side of the right door 2B and is provided to record at least one image of refrigerated goods placed on the shelves 4, namely at least from a "right" spatial region of the cooling chamber 3 which is located behind the right door 2B when this door is closed;
- to a fourth image recording module CCM-3, which is disposed on the ceiling of the cooling chamber 3 and is provided to record at least one image, from above, of refrigerated goods accommodated in the pulled-out regions of the drawers 5A, 5B.

The first and the fourth image recording module CCM-0 and CCM-3 are also referred to in the following without limiting the generality as "body image recording modules." The second and the third image recording module CCM-1 and CCM-2 are also referred to in the following without limiting the generality as "door image recording modules."

The central module CMM can be connected via data technology, for example via a D bus, an Ethernet connection etc., to further modules (not shown) of the refrigerator 1, for example to a user interface etc., and can actuate the same. The refrigerator 1 is configured in particular to enable a wireless and/or wired data communication between the central module CMM and an external unit such as a network server, cloud computer etc. To this end, the refrigerator 1, in particular the central module CMM, can be equipped with a communication facility (not shown) such as a WLAN module, Bluetooth module, Ethernet module etc.

Figure 2:
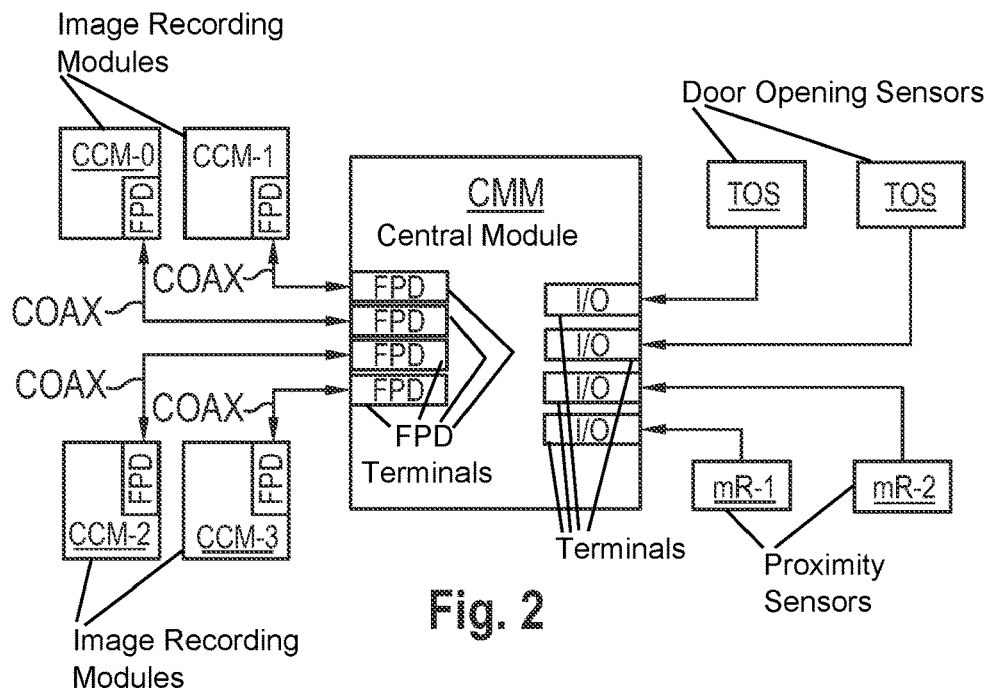
FIG. 2 is a block diagram illustrating the data technology connections of several functional units of the double-door refrigerator of FIG. 1.

FIG. 2 shows a sketch of the data technology connections of several functional units of the refrigerator 1 of FIG. 1.

The image recording modules CCM-0 to CCM-3 are connected to the central module CMM in each case via an FPD ("flat panel display") link, in particular via an FPD-Link III.

In this case, the FPD terminals FPD of the image recording modules CCM-0 to CCM-3 are advantageously connected to the FPD terminals FPD of the central module CMM in each case via coaxial cables COAX, wherein in each case an FPD-Link III is provided. The control channel thereof uses the I2C bus protocol in this case by way of example. In addition, video signals can be transmitted from the associated image recording module CCM-0 to CCM-3 to the central module CMM and on the other hand the associated image recording module CCM-0 to CCM-3 supplied with electrical energy via the coaxial cable COAX in accordance with the so-called "Power over Coaxial"/"PoC" standard.

In addition, an interface between a camera sensor 6 (see FIG. 3) of the associated image recording module CCM-0 to CCM-3 and the central module CMM (expressed more precisely: the system master module SMM thereof) is provided via the respective coaxial cable COAX in accordance with the MIPI-CSI specification, in other words in accordance with CSI-2 v3.0, CSI-3 v1.1, etc.

The central module CMM is connected via respective signal lines to the sensors mR-1 and MR-2 and to respective door opening sensors TOS for the doors 2A, 2B. The door opening sensors TOS can be for example microswitches, magnet switches etc. and detect whether the associated door 2A, 2B is open or closed.

Figure 3:
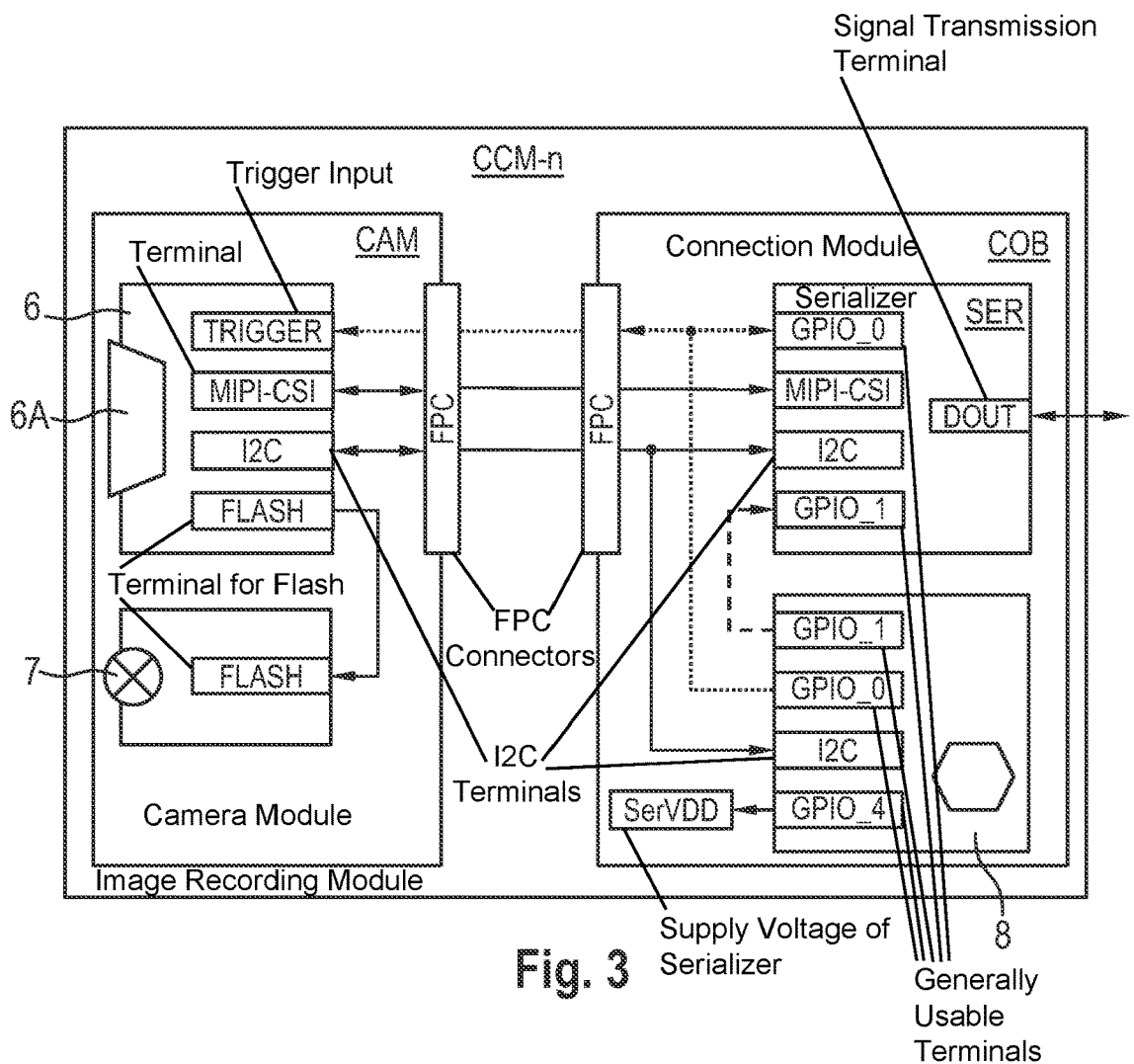
FIG. 3 is a block diagram of a functional unit of the double-door refrigerator of FIG. 1 in the form of an image recording module.

FIG. 3 shows a block diagram of an image recording module CCM-n where n={0, . . . , 3}. The image recording module CCM-n has a ("camera") module CAM and a ("connection") module COB ("connection board").

The camera module CAM has a digital camera sensor 6, in particular digital color camera sensor, which can be actuated for recording images via a trigger input TRIGGER and which can output image data via an MIPI-CSI terminal MIPI-CSI. A I2C terminal I2C is also present for a control channel which uses the I2C bus protocol. These terminals are connected via an FPC (flexible printed circuit) connector to corresponding terminals GPIO_0, MIPI-CSI or I2C of a serializer SER of the connection module COB. The camera sensor 6 can include driver software etc. in addition to the actual sensor element 6A (e.g. a CMOS sensor element).

A terminal FLASH of the camera module CAM is optionally connected to a flash 7, for example an LED. This can be used to transmit a signal to the flash 7 so that the flash triggers together with an image recording by the camera sensor 6.

The connection module COB can also have a gyrosensor 8, for example depending on the application purpose. The gyrosensor 8 can be switched to active or inactive, for example depending on the application purpose. In the present exemplary embodiment, the gyrosensors 8 of the stationary body image recording modules CCM-0 and CCM-3 are permanently inactive (for example permanently deenergized), while the gyrosensors 8 of the door image recording modules CCM-1 and CCM-2 which are moved with the doors are active.

In particular, the gyrosensors 8 of the door image recording modules CCM-1 and CCM-2 are oriented parallel to the axes of rotation of the doors 2A, 2B and thus along a z axis, so that by using the gyrosensors 8 a rotational movement or change of angle of the associated door 2A, 2B in each case can be determined particularly easy without taking the z components into consideration.

The gyrosensor 8 can have a I2C terminal I2C for connecting a control channel, which is connected to the I2C terminal I2C of the serializer SER.

A terminal GPIO_0 of the gyrosensor 8 is connected to the terminal GPIO_0 of the serializer SER and to the trigger input TRIGGER of the camera module CAM. A first trigger signal can for example be output via the terminal GPIO_0 of the gyrosensor 8 when the opening of the monitored door 2A or 2B fulfills a certain first condition, for example the door 2A or 2B reaches a certain first pivot angle, possibly linked to the further subcondition that a door opening process or a door closing process is present (which can be established by the direction of rotation). Such a pivot angle can also be referred to as the "trigger angle," the first trigger signal also as the "self-trigger." The first trigger signal then triggers an image recording by the camera module CAM of the same door image recording module CCM-1, CCM-2 and is also output via the serializer SER to the central module CCM.

In this case, the camera module CAM is advantageously embodied for low energy consumption in such a way that the camera sensor 6 is in a power-saving mode if no trigger signal is applied to it. If a trigger signal is applied, the camera sensor 6 wakes up from the power-saving mode and records at least one image. If the trigger signal is deactivated again, the camera sensor 6 automatically returns to the power-saving mode.

In addition, a terminal GPIO_1 of the gyrosensor 8 is connected to a terminal GPIO_1 of the serializer SER. A second trigger signal can for example be output via the terminal GPIO_1 of the gyrosensor 8 when the opening of the monitored door 2A or 2B fulfills a certain second condition, for example the door 2A or 2B reaches a certain second pivot angle, possibly linked to the subcondition that a door opening process or a door closing process is present. The second trigger signal can be output during an opening and closing of a door 2A, 2B, with or after the first trigger signal.

Furthermore, a terminal GPIO_4 of the gyrosensor 8 is configured in such a way that a supply voltage SerVDD of the serializer SER and thus of the serializer SER itself can be activated or deactivated via the terminal. This is advantageous for reducing power consumption, as a serializer SER consumes a comparatively large amount of current.

The serializer SER has a signal transmission terminal DOUT, for example a data transmission terminal FPD in accordance with FPD-Link III, and is configured to serialize image data supplied from the camera module CAM and then output it via the signal transmission terminal DOUT. Further signals such as the trigger signals etc. can also be output via the signal transmission terminal DOUT. The serializer SER is further configured to receive incoming control signals and, if required, output them to the camera module CAM and/or to the gyrosensor 8.

Because the gyrosensor 8 is inactive or possibly even not present in the body image recording modules CCM-0 and CCM-3, the trigger signal which triggers an image recording is received there exclusively via the signal transmission terminal DOUT and forwarded to the terminal TRIGGER. In the body image recording modules CCM-0 and CCM-3, there is therefore also no possibility to specifically deactivate the supply voltage SerVDD of the serializer SER. Instead, the body image recording modules CCM-0 and CCM-3 can be deactivated in their entirety by switching off the current supply via the coaxial cable COAX.

Figure 4:
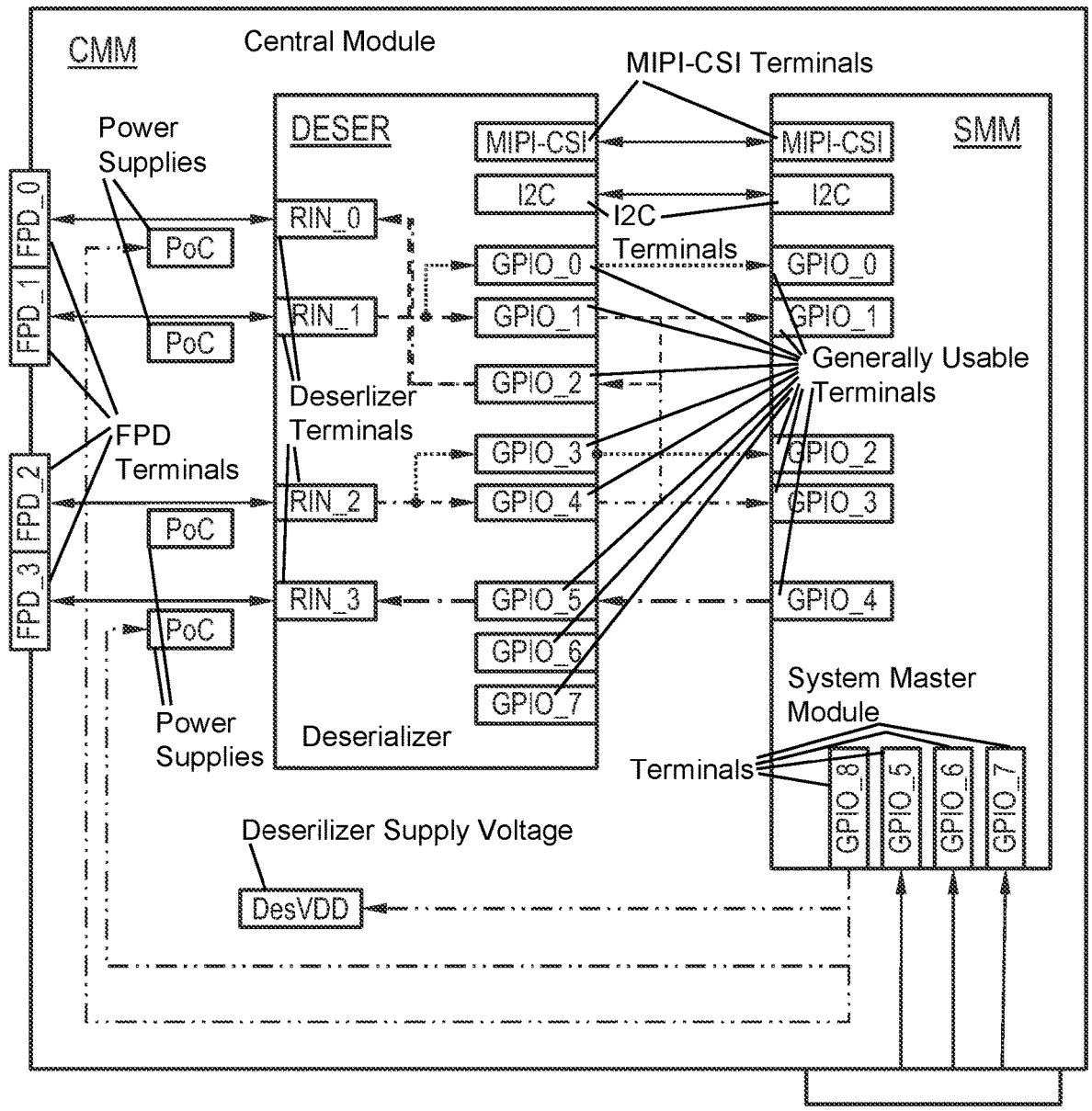
FIG. 4 is a block diagram of a functional unit of the double-door refrigerator of FIG. 1 in the form of a central master module.

FIG. 4 shows a block diagram of the central module CMM. The central module CMM has four interfaces FPD_0 to FPD_3 for FPD Link III connections to the image recording modules CCM-0 to CCM-3. The interfaces FPD_0 to FPD_3 are routed to terminals RIN_0 to RIN_3 of a deserializer DESER of the central module CMM, which deserializes the incoming serialized data again and forwards it to the ("system master") module SMM, for example image data via MIPI-CSI and bus data via I2C.

The terminals GPIO_0 to GPIO_4, via which the first and second trigger signals of the image recording modules CCM-1 and CCM-2 are routed, are also available to the system master module SMM for data exchange with the deserializer DESER.

Furthermore, the system master module SMM has the terminals GPIO_5 and GPIO_6, via which the sensors mR-1 and mR-2 are connected. Through the use of the signals applied to the terminals GPIO_5 and GPIO_6, the system master module SMM can determine whether the drawer 5A or 5B has once again reached a certain pushed-in position after previously being pulled out.

The door opening sensors TOS are connected via the terminal GPIO_7 of the system master module SMM, so that information indicating that at least one of the doors 2A and/or 2B are open is provided via this route.

The supply voltage DesVDD of the deserializer DESER can be activated and deactivated via the terminal GPIO_8 of the system master module SMM. Furthermore, the electrical power to the stationary body image recording modules CCM-0 and CCM-3 can be interrupted via the terminal GPIO_8, so that the modules are deactivated in their entirety. The door image recording modules CCM-1 and CCM-2, on the other hand, are not deactivated via the terminal GPIO_8.

The system master module SMM can be for example a microprocessor, ASIC, FPGA, etc. In one development, the system master module SMM can actuate yet further functional components of the refrigeration appliance 1.

Figure 5:
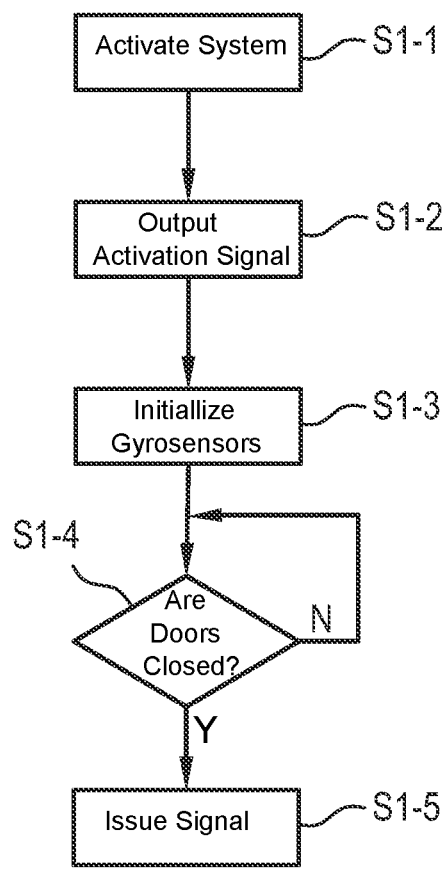
FIG. 5 is an exemplary flowchart for initializing image recording modules.

FIG. 5 shows a flow chart for initializing the image recording system shown in FIG. 2 following an operational startup of the refrigeration appliance 1.

In this case, in a step S1-1, the operational startup initially activates the system master module SMM.

In a second step S1-2, an activation signal is output by the system master module SMM via the terminal GPIO_8, through the use of which (a) the supply voltage DesVDD for the deserializer DESER is activated in such a way that the latter is placed in its normal operational state, and (b) the power supply, PoC, for the body image recording modules CCM-0 and CCM-3 is established. The door image recording modules CCM-1 and CCM-2 are activated automatically with the operational startup of the refrigeration appliance 1.

In a step S1-3, the gyrosensors 8 of the door image recording modules CCM-1 and CCM-2 are initialized with the aid of the system master module SMM, at the end of which they are in an operational state/awake state.

In a subsequent step S1-4, monitoring is carried out to determine whether the doors 2A and 2B are closed. If this is not the case ("N"), the verification is continued.

If on the other hand this is the case ("Y"), in step S1-5 a signal is issued to the terminal GPIO_8 of the system master module SMM, on the basis of which the deserializer DESER and the body image recording modules CCM-0 and CCM-3 are deactivated.

Upon completion of this initialization routine, the individual modules can have the following operational state when both doors 2A and 2B are closed:

The system master module SMM is activated and operationally ready or is in the normal operational state/awake mode;

The deserializer DESER is deactivated;

The body image recording modules CCM-0 and CCM-3 are deactivated or deenergized;

The door image recording modules CCM-1 and CCM-2 are supplied with current, but their serializer SER is deactivated and their camera sensors 6 are in their power-saving mode, while the gyrosensors 8 are in their normal operational state or awake mode.

In a variant thereof—possibly after expiration of a predetermined duration during which both doors 2A and 2B have been kept closed, for example 15 to 30 s—the system master module SMM can also be placed in a power-saving mode, from which it can be woken up for example by receiving a signal via terminal GPIO_7 indicating that at least one of the door opening sensors TOS has detected an opening of at least one of the doors 2A and/or 2B.

Figure 6:
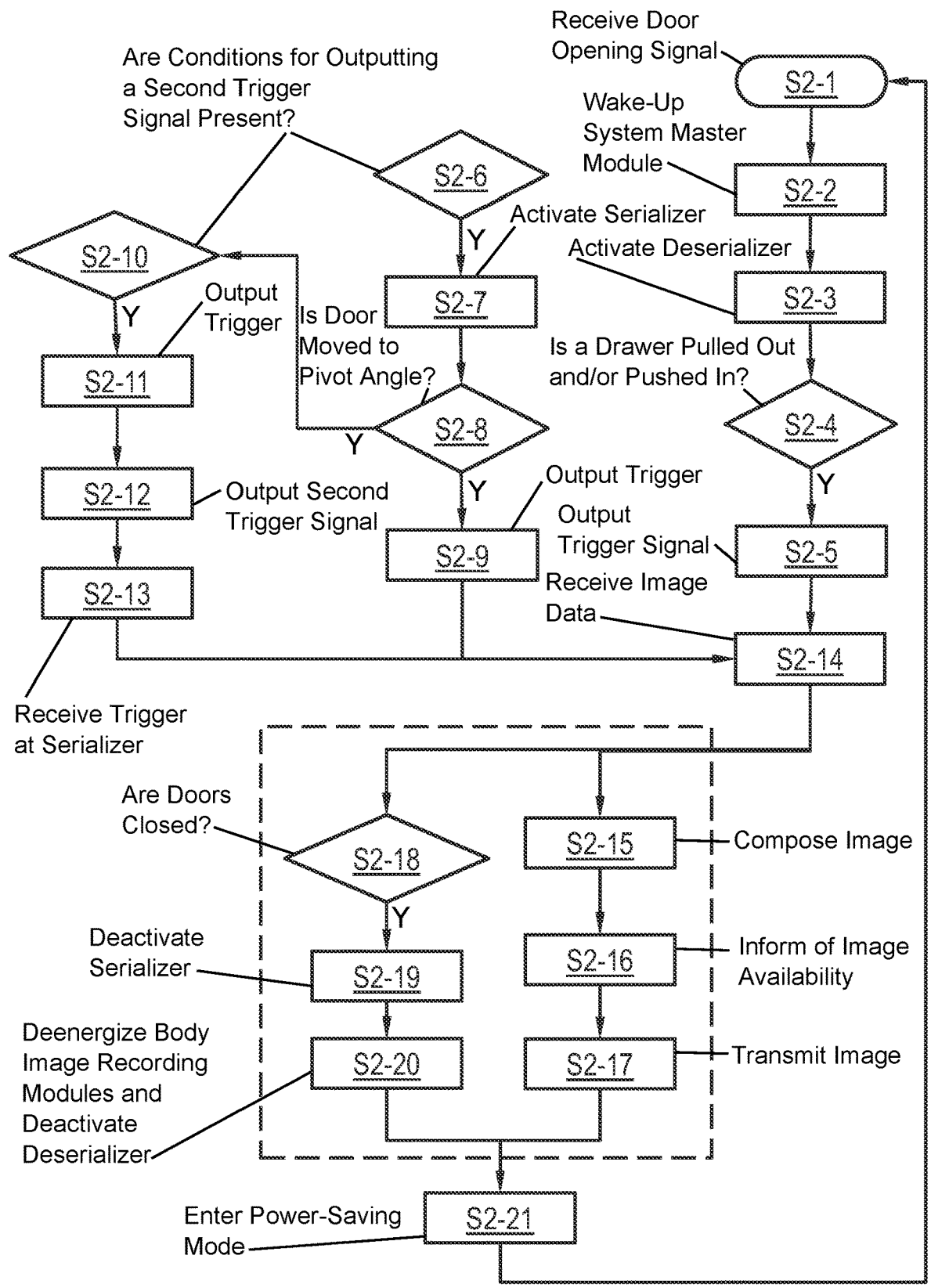
FIG. 6 is an exemplary flowchart for recording images by using the image recording modules.

FIG. 6 shows a possible flowchart for the recording of images by using the image recording modules CCM-0 to CCM-3 following the opening of at least one of the doors 2A and/or 2B. In this case, it is assumed that the individual modules are in the operational state as described above after completion of the initialization routine and the system master module SMM is in a power-saving mode.

In a step S2-1, a door opening signal from at least one door opening sensor TOS is received at GPIO_7 of the system master module SMM when at least one of the two doors 2A, 2B is opened.

In a step S2-2, the system master module SMM is woken up by the door opening signal.

In a step S2-3, the system master module SMM which is now awake activates the deserializer DESER and the body image recording modules CCM-0 and CCM-3 via GPIO_8.

In a step S2-4 following step S2-3, the system master module SMM verifies on the basis of the signals received at the terminals GPIO_5 and GPIO_6 from the sensors mR-1 or mR-2 whether (a) at least one of the drawers 5A, 5B has been pulled out by a predetermined pull-out distance, which can be established when the sensing element passes the associated sensor mR-1 or mR-2 in each case for the first time, and whether (b) this drawer 5A, 5B is being pushed in again, which can be established when the sensing element passes the associated sensor mR-1 or mR-2 in each case once again (this time in the opposite direction).

An additional verification condition can reside in firstly verifying whether the drawer 5A, 5B has been or is being pulled out at all, in other words even by a short distance. This can be queried by using an independent sensor, the measurement output of which can likewise be connected to the system master module SMM (not shown).

If this is not the case, the verification is continued. If on the other hand this is the case ("Y"), in step S2-5 the system master module SMM outputs a trigger signal to the body image recording module CCM-3, namely in this case by way of example from its terminal GPIO_4 to the terminal GPIO_5 of the deserializer DESER, which transmits the signal or a corresponding item of information via RIN_3 and further via FPD_3 and a coaxial cable COAX used with FPD-Link III to the signal transmission terminal DOUT of the serializer SER, from where it reaches the trigger input TRIGGER of the camera module CAM of the drawer image recording module CCM-3, as a result of which at least one image is recorded by using the associated camera sensor 6, possibly with the flash. The image shows a top view of a content of the drawer 5A and/or 5B, which is being retracted but is still partially pulled out.

The gyrosensors 8 of the door image recording modules CCM-1 and CCM-2 are permanently awake. In a step S2-6, they verify, based on the assumption that the respective door 2A, 2B was previously closed, whether the door 2A or 2B is moving. If this is the case ("Y"), the serializer SER is activated in step S2-7. In addition, it is assumed that in this case also the steps S1-1 to S1-3 are being or have been carried out, so that the deserializer DESER and the body image recording modules CCM-0 and CCM-3 are activated.

In step S2-8, verification is carried out to determine whether the condition(s) for outputting the first trigger signal (which can also be referred to as the "self-trigger") is or are present.

If the conditions for triggering the self-trigger are present ("Y"), for example if the associated door 2A or 2B is moved for closing and in the process reaches a predetermined trigger or pivot angle, in a step S2-9 the self-trigger is output at the terminal GPIO_0 of the gyrosensor 8, namely both to the trigger input TRIGGER of the camera module CAM, which thereupon triggers an image recording by the camera sensor 6 of the camera module CAM, and also via the serializer SER to the deserializer DESER and further to the system master module SMM. With the image recording, the flash 7 is also triggered via the terminals FLASH. The associated image shows the cooling chamber 3.

Expressed more precisely, the self-trigger is transmitted from the door image recording module CCM-1 to the terminal RIN_1 of the deserializer DESER and from the terminal GPIO_0 thereof to the terminal GPIO_0 of the system master module SMM. The self-trigger of the door image recording module CCM-2 is transmitted to the terminal RIN_2 of the deserializer DESER and from the terminal GPIO_3 thereof to the terminal GPIO_2 of the system master module SMM. The first trigger signal is used by the system master module SMM inter alia to assign the image data received as a result of the image recording to the correct door image recording module CCM-1 or CCM-2.

In a step S2-10, verification is carried out in parallel with step S2-6 to determine whether the condition(s) for outputting the second trigger signal (which can also be referred to as the "CCM-0 trigger") is or are present.

If this is the case ("Y"), in a step S2-11 the CCM-0 trigger is output at the terminal GPIO_1 of the gyrosensor 8, namely via the serializer SER to the deserializer DESER and further to the system master module SMM. Expressed more precisely, the CCM-0 trigger is transmitted from the door image recording module CCM-1 to the terminal RIN_1 of the deserializer DESER and from the terminal GPIO_1 thereof to the terminal GPIO_1 of the system master module SMM. The CCM-0 trigger of the door image recording module CCM-2 is transmitted to the terminal RIN_2 of the deserializer DESER and from the terminal GPIO_4 thereof to the terminal GPIO_3 of the system master module SMM.

In a step S2-12, the second trigger signal is output from the system master module SMM via the same terminal at which it was received (GPIO_1 or GPIO_3), via the terminal GPIO_2 of the deserializer DESER via RIN_0 to the body image recording module CCM-0. Alternatively, the output terminal of the deserializer DESER outputting the second trigger signal (GPIO_1 or GPIO_4) can branch to the terminal GPIO_2 of the deserializer DESER, so that no action is required from the system master module SMM for the forwarding to the body image recording module CCM-0 in step S2-12.

In step S2-13, the CCM-0 trigger is received by the serializer SER of the body image recording module CCM-0 and forwarded to the trigger input TRIGGER of the associated camera module CAM, as a result of which an image recording of the inner sides of the doors 2A and 2B is triggered. The second trigger signal is used by the system master module SMM inter alia to assign the image data received as a result of the image recording of the body image recording module CCM-0 to the body image recording module CCM-0.

The image data generated in the steps S2-5, S2-9 and/or S2-13 by the respective camera modules CAM of the image recording modules CCM-3, CCM1-1/CCM-2 or CCM-0 is transmitted via the MIPI-CSI terminals to the system master module SMM and, in a step S2-14, received by the system master module SMM, possibly together with further information such as a time of the image recording etc. In order to prevent a transmission of image data of different camera sensors 6 from overlapping, it is advantageous if the trigger signals arriving at the camera sensors 6 are spaced apart from each other by a time interval of at least 15 ms.

Once the image data etc. together with any further information has been received by the system master module SMM, in a step S2-15 an image is composed therefrom, for example in JPG or PNG format etc. In one development, the image may have been cropped to a region of interest (RoI) of the image. Metadata can be attached to the image, for example an identifier of the image recording module CCM-0 to CCM-4 carrying out the recording, a time stamp, a resolution, compression information, etc.

In a step S2-16, an external instance/backend (not shown) such as a network server etc. is informed that an image is available.

In a step S2-17, the image can then be transmitted to the external instance/backend.

The steps S2-18 to S2-20 are carried out in parallel with the steps S2-15 to S2-17. In step S2-18, verification is carried out to determine whether all doors 2A, 2B are closed, possibly for a predetermined duration. This is advantageously measured in such a way that the steps S2-15 to S2-17 are completed before step S2-18 is carried out.

If all doors 2A, 2B are closed, possibly for a predetermined period ("Y"), the serializers SER of the door image recording modules CCM-1 and CCM-2 are deactivated in a step S2-19. Subsequently, in a step S2-20, the body image recording modules CCM-0 and CCM-3 are deenergized and the deserializer DESER deactivated.

In a step S2-21 following the steps S2-17 and S2-20, the system master module SMM is placed in a power-saving mode. The same initial situation is thus present as in step S2-1, to which the method then branches.

If during the steps S2-15 to S2-20 a new image is recorded by the same camera sensor 6 as the image currently being generated, the steps S2-15 to S2-20 currently being carried out are aborted, and the method returns to step S2-1.

Figure 7:
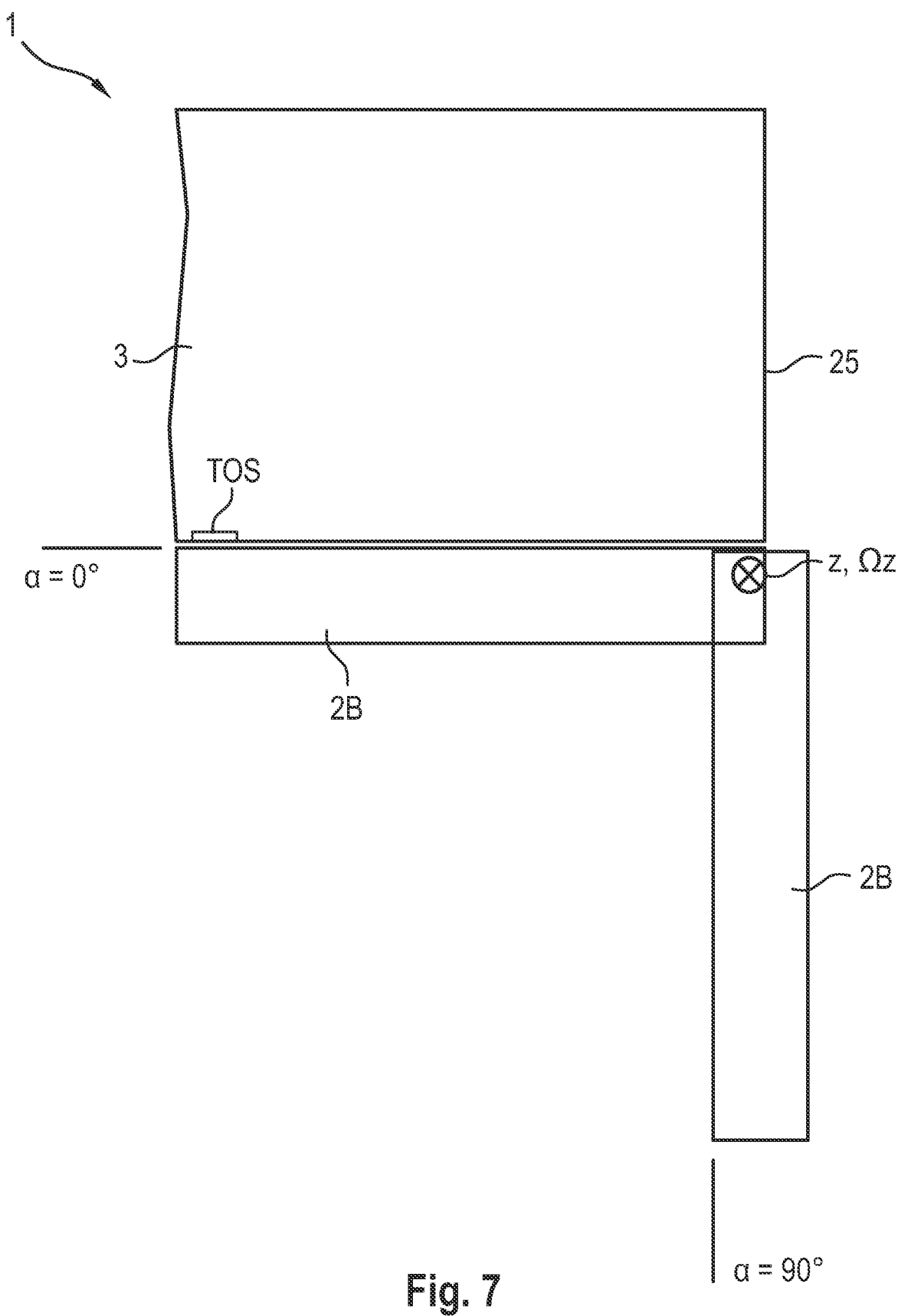
FIG. 7 is a fragmentary, top-plan view of a section of the refrigerator of FIG. 1 in the region of a right door, which is shown at two different pivot angles.

In the following FIG. 7 and FIG. 8, the initialization of the gyrosensors 8 from step S1-3 is explained in more detail: to this end, FIG. 7 shows a sketch of the right door 2B at a pivot angle $\alpha=0°$, at which the door 2B rests on the body 25 (possibly via a seal) and closes off the cooling chamber 3, and a door 2B which is rotated relative thereto by 90° about the vertically disposed axis of rotation z, which corresponds to a pivot angle $\alpha=90°$. In this case, the axis of rotation z projects vertically from the image plane. If the door 2B is closed, this can be detected at least approximately by using the associated door opening sensor TOS.

The angular velocity $\Omega z$ of the door 2B about its axis of rotation z can be detected by the gyrosensor 8, from which angular velocity the pivot angle $\alpha$ is calculated by using temporal integration. In one development, the maximum detectable value of the angular velocity $\Omega z$ amounts to 90°/s. In one development, a direction of rotation of the door 2B can also be determined by the gyrosensor 8.

Figure 8:
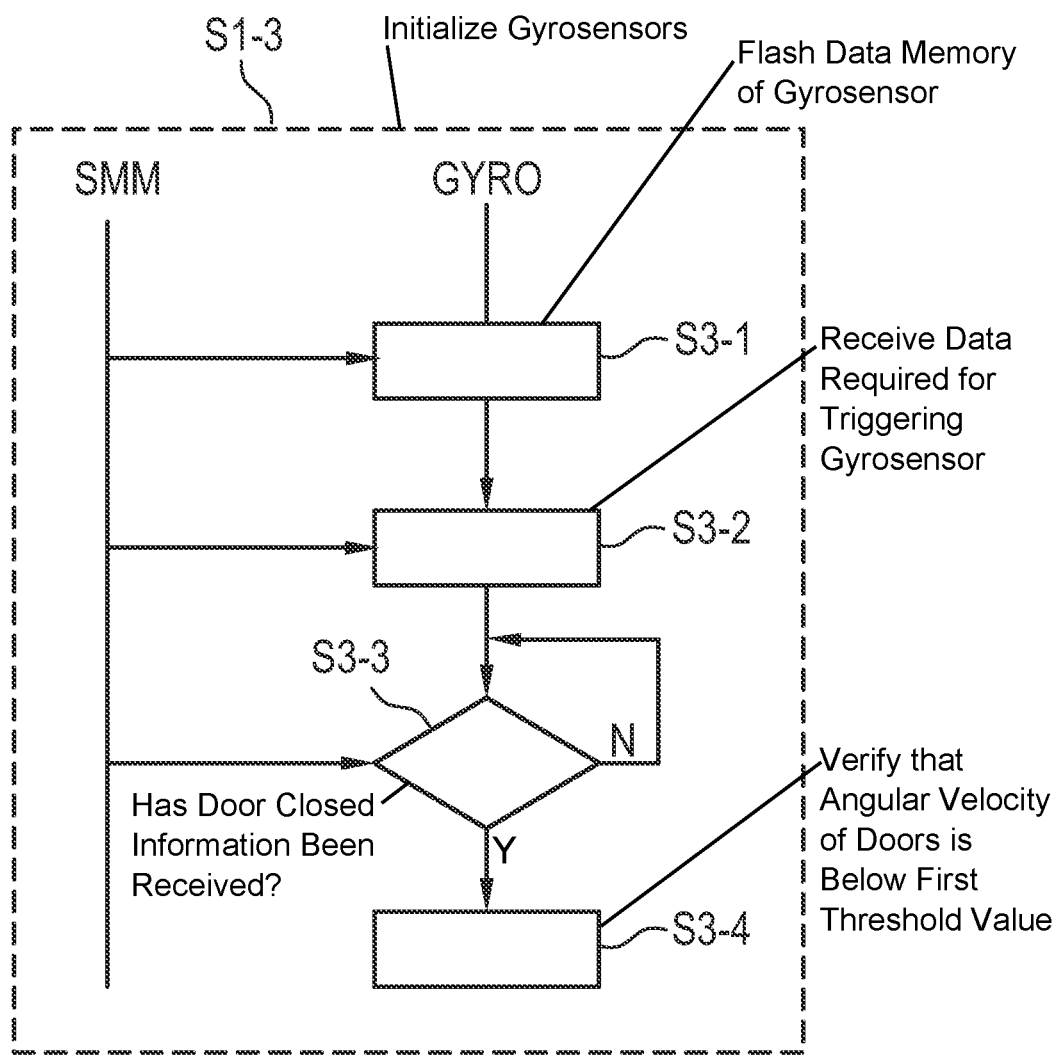
FIG. 8 is a more detailed representation of an initialization step S1-3, illustrated in FIG. 5.

FIG. 8 shows a more detailed representation of the step S1-3 described in FIG. 5 for initializing the gyrosensors 8, in this case by way of example on the basis of the door 2B. When the refrigerator 1 is commissioned, in a step S3-1 the data memory of the gyrosensor 8 of the third image recording module CCM-2 is flashed from the system master module SMM via the I2C bus if the driver software is present in a volatile memory. A prerequisite in this case is that the serializer SER is initially in operation/awake when the refrigerator 1 is commissioned.

In a subsequent step S3-2, the system master module SMM receives data required for triggering at the gyrosensor 8 via the I2C bus of the serializer SER, for example the trigger angle $x\alpha1$ for the first trigger signal (for example) 1.5°, the trigger angle $x\alpha2$ for the second trigger signal (for example 0.5°), etc. Several trigger angles $x\alpha1$ and/or trigger angles $x\alpha2$ can optionally be transmitted and used by the gyrosensor 8. An item of time information in relation to the trigger signals, for example that the first trigger signal and the second trigger signal must be output offset by at least a predetermined duration, can also be transmitted. This can be expedient in order to ensure that the system master module SMM only ever receives image data of just one image at any one time.

In a subsequent step S3-3, verification is carried out to determine whether information detected by the door opening sensor TOS indicating whether the door 2B is closed or is in its closed state has been received by the gyrosensor 8 from the system master module SMM via the I2C bus. If this is not the case ("N"), the occurrence of this case is awaited.

If this is the case ("Y"), in step S3-4 verification is carried out by using the gyrosensor 8 to determine whether the angular velocity $\Omega z$ of the door 2B lies below a predetermined first threshold value $\Omega z;thr1$, in particular is less than 0.3°/s. If this is not the case ("N"), the method branches back to step S3-3, alternatively step S3-4 is repeated (not shown).

If on the other hand this is the case ("Y"), in step S3-45 the value for the pivot angle $\alpha$ is set to 0°, a time value t is set to zero and subsequently the serializer SER is deactivated via GPIO_4.

The initialization of the gyrosensor 8 is thus completed, and the method can proceed for example to step S1-6.

A step S3-6 can optionally be carried out between step S3-4 and step S3-5, in which verification is carried out by using the gyrosensor 8 to determine whether the door 2B is at rest or is carrying out a closing movement. If this is not the case ("N"), the method branches back to step S3-3, otherwise ("Y") proceeds to step S3-5.

Figure 9:
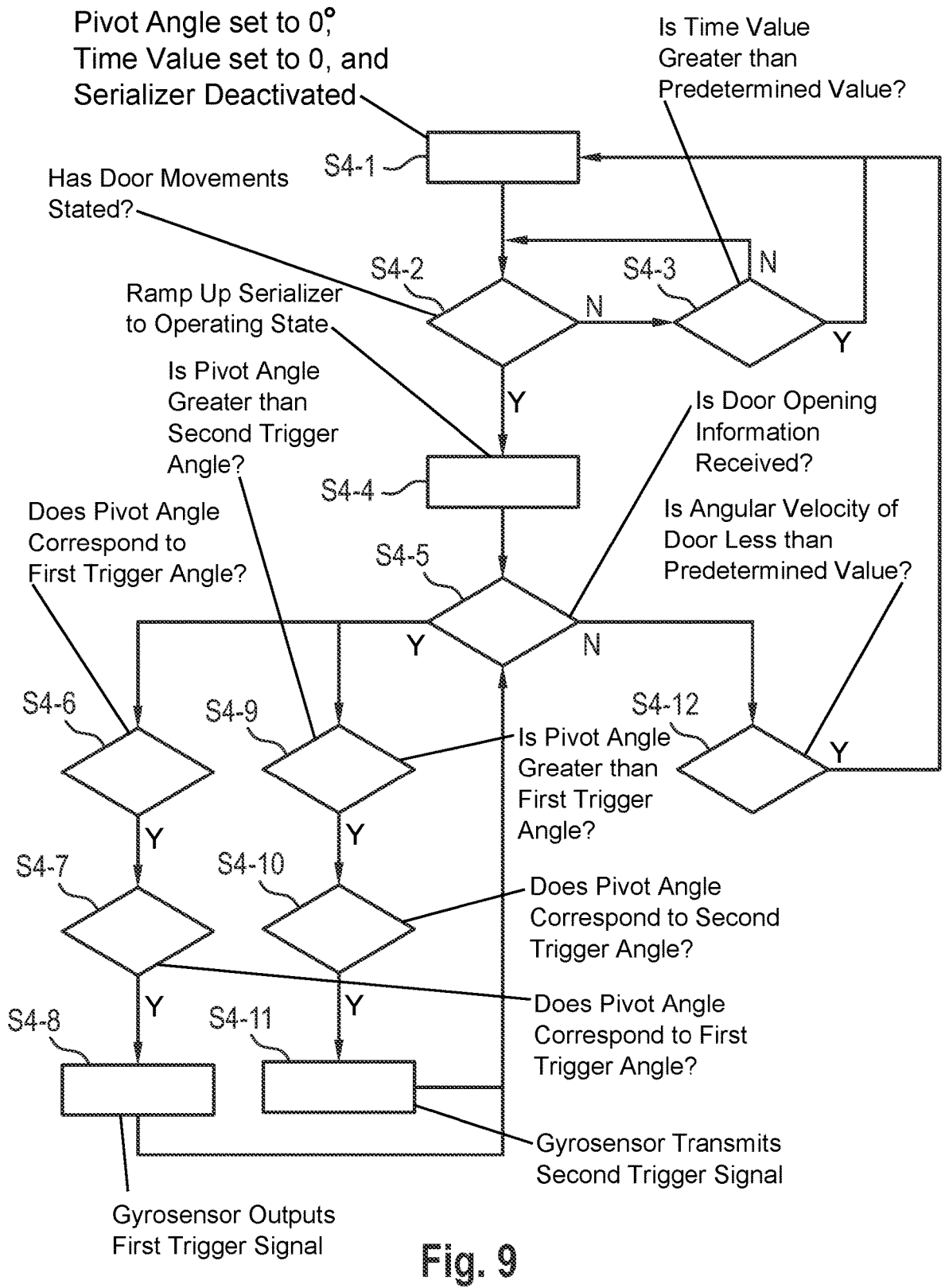
FIG. 9 is a more detailed representation of some of the method steps illustrated n FIG. 5.

FIG. 9 shows a more detailed representation of the steps S2-6 to S1-11 described in FIG. 5 for the doors 2A, 2B, in this case by way of example on the basis of the door 2B.

In this case, it is assumed that initially, in a step 4-1 analogous to step S3-5, the value for the pivot angle $\alpha$ has been set to 0°, a time value t has been set to zero, and the serializer SER has been deactivated.

In a step S4-2 analogous to step S2-6, verification is carried out to determine whether a door movement is being started. This can be determined for example by using the gyrosensor 8 of the image recording module CCM-2 by verification being carried out to determine whether the angular velocity $\Omega z$ of the door 2B is at least as great as or greater than a predetermined second threshold value $\Omega z$,thr2, for example whether $\Omega z$>1°/s applies. At the same time, the time value t is incremented, for example in steps of seconds or minutes.

If it has not been established in step S4-2 that a door movement is being or has been started ("N"), in step S4-3 verification is carried out to determine whether the time value t is greater than a predetermined—comparatively high—value, for example whether t 15 min applies. If this is not the case ("N"), the method branches back to step S4-2, otherwise ("Y") returns to step S4-1, wherein the time value t is then reset to zero, the pivot angle $\alpha$ is set to 0° and the serializer SER is deactivated.

If on the other hand the gyrosensor 8 establishes in step S4-2 that a door movement is being or has been started ("Y"), in a step S4-4 analogous to step S2-7 the associated serializer SER is firstly ramped up into its operating state, for example activated, by the gyrosensor 8.

Subsequently, in step S4-5 the gyrosensor 8 verifies whether information indicating whether the door 2B is open is received from the system master module SMM, for example via the I2C bus.

If this is the case ("Y"), in a step S4-6 the gyrosensor 8 verifies or monitors whether the pivot angle $\alpha$ is greater than the first trigger angle $x\alpha 1$ plus a predetermined angle value, for example whether $\alpha > x\alpha 1 + y°$ applies, for example whether $\alpha > x\alpha 1 + 3°$ applies. This is used to verify whether or not the door 2B has been opened perceptibly beyond the first trigger angle $x\alpha 1$. If this is not the case, the verification is continued in step S4-6. The verification can then be repeated for example at intervals of milliseconds.

If on the other hand the verification in step S4-6 has determined that the verified condition has occurred ("Y"), the method branches to step S4-7 in which the gyrosensor 8 verifies whether the pivot angle $\alpha$ corresponds to the first trigger angle $x\alpha 1$. This corresponds to the situation that the door 2B is being closed again and in the process has reached the first trigger angle $x\alpha 1$. If this is not the case, the verification is continued in step S4-7. The verification can then be repeated for example at intervals of milliseconds.

The steps S4-6 and S4-7 correspond to step S2-8.

If on the other hand the verification in step S4-7 has determined that the condition $\alpha = x\alpha 1$ has occurred ("Y"), the method branches to a step S4-8 analogous to step S2-9. In step S4-8 the gyrosensor 8 outputs the first trigger signal/self-trigger via the terminal GPIO_0, inter alia in order to record an image by using the camera module CAM of the image recording module CCM-2.

Where there are several different first trigger angles $x\alpha 1$, the steps S4-6 to S4-8 are carried out for each of these trigger angles $x\alpha 1$.

Subsequently, in step S4-5 the gyrosensor 8 verifies whether information indicating whether the door 2B is open is received from the system master module SMM, for example via the I2C bus.

If this is the case ("Y"), in step S4-6 the gyrosensor 8 verifies or monitors whether the pivot angle $\alpha$ is greater than the first trigger angle $x\alpha 1$ plus a predetermined angle value, for example whether $\alpha > x\alpha 1 + y°$ applies, for example whether $\alpha > x\alpha 1 + 3°$ applies. This is used to verify whether or not the door 2B has been opened perceptibly beyond the first trigger angle $x\alpha 1$. If this is not the case, the verification is continued in step S4-6. The verification can then be repeated for example at intervals of milliseconds.

If on the other hand the verification in step S4-6 has determined that the verified condition has occurred ("Y"), the method branches to step S4-7 in which the gyrosensor 8 verifies whether the pivot angle $\alpha$ corresponds to the first trigger angle $x\alpha 1$. This corresponds to the situation that the door 2B is being closed again and in the process has reached the first trigger angle $x\alpha 1$. If this is not the case, the verification is continued in step S4-7. The verification can then be repeated for example at intervals of milliseconds.

If on the other hand the verification in step S4-7 has determined that the condition $\alpha = x\alpha 1$ has occurred ("Y"), the method branches to step S4-8. In step S4-8 the gyrosensor 8 outputs the first trigger signal/self-trigger via the terminal GPIO_0, inter alia in order to record an image by using the camera module CAM of the image recording module CCM-2.

Where there are several different first trigger angles $x\alpha 1$, the steps S4-6 to S4-8 are carried out for each of these trigger angles $x\alpha 1$.

The steps S4-9 to S4-11 are carried out in parallel with and analogously to the steps S4-6 to S4-8.

In step S4-9 the gyrosensor 8 therefore verifies or monitors whether the pivot angle $\alpha$ is greater than the second trigger angle $x\alpha 2$ plus a predetermined angle value, for example whether $\alpha > x\alpha 2 + y°$ applies, for example whether $\alpha > x\alpha 2 + 3°$ applies. The predetermined angle value y can in principle differ for the two trigger values $x\alpha 1$, $x\alpha 2$. Step S4-9 is used to verify whether or not the door 2B has been opened perceptibly beyond the second trigger angle $x\alpha 2$. If this is not the case, the verification is continued in step S4-9. The verification can then be repeated for example at intervals of milliseconds.

If on the other hand the verification in step S4-9 has determined that the verified condition has occurred ("Y"), the method branches to step S4-10, in which the gyrosensor 8 verifies whether the pivot angle $\alpha$ corresponds to the second trigger angle $x\alpha 2$. This corresponds to the situation that the door 2B is being closed again and in the process has reached the second trigger angle $x\alpha 2$. If this is not the case, the verification is continued or repeated in step S4-10. The verification can then be repeated for example at intervals of milliseconds.

The steps S4-9 and S4-10 are analogous to step S2-10.

If on the other hand the verification in step S4-10 has determined that the condition $\alpha = x\alpha 2$ has occurred ("Y"), the method branches to the step S4-11, which is analogous to step S2-11. In step S4-11, the gyrosensor 8 transmits the second trigger signal/CCM-0 trigger via the terminal GPIO_1 to the system master module SMM, which in turn triggers an image recording by the image recording module CCM-0.

Where there are several different second trigger angles $x\alpha 2$, the steps S4-9 to S4-11 are carried out for each of these trigger angles $x\alpha 2$.

Starting from the steps S4-8 and S4-11, the method can for example branch back to step S4-5.

If on the other hand it is established in step S4-5 that the system master module SMM has received information for example via the I2C bus indicating that the door 2B is closed ("N"), in a step S4-12 verification is carried out by using the gyrosensor 8 to determine whether the angular velocity $\Omega z$ of the door 2B is less than a predetermined—comparatively low—value, for example whether $\Omega z < 0.3°/s$ applies. This is used to verify whether the closed door 2B is or is not yet at rest. If this is not yet the case, the verification is continued or repeated in step S4-12. The verification can then be repeated for example at intervals of milliseconds. If on the other hand this is the case ("Y"), the method returns to step S4-1.

In a variant of the sequence shown in FIG. 9, the steps S4-6 and S4-9 are automatically carried out after step 4-4 when the system master module SMM transmits the information indicating that the door 2B is open. Step S4-12 is automatically carried out when the system master module SMM transmits the information indicating that the door 2B is closed. An explicit query in step S4-5 is not required to this end.

Figure 10:
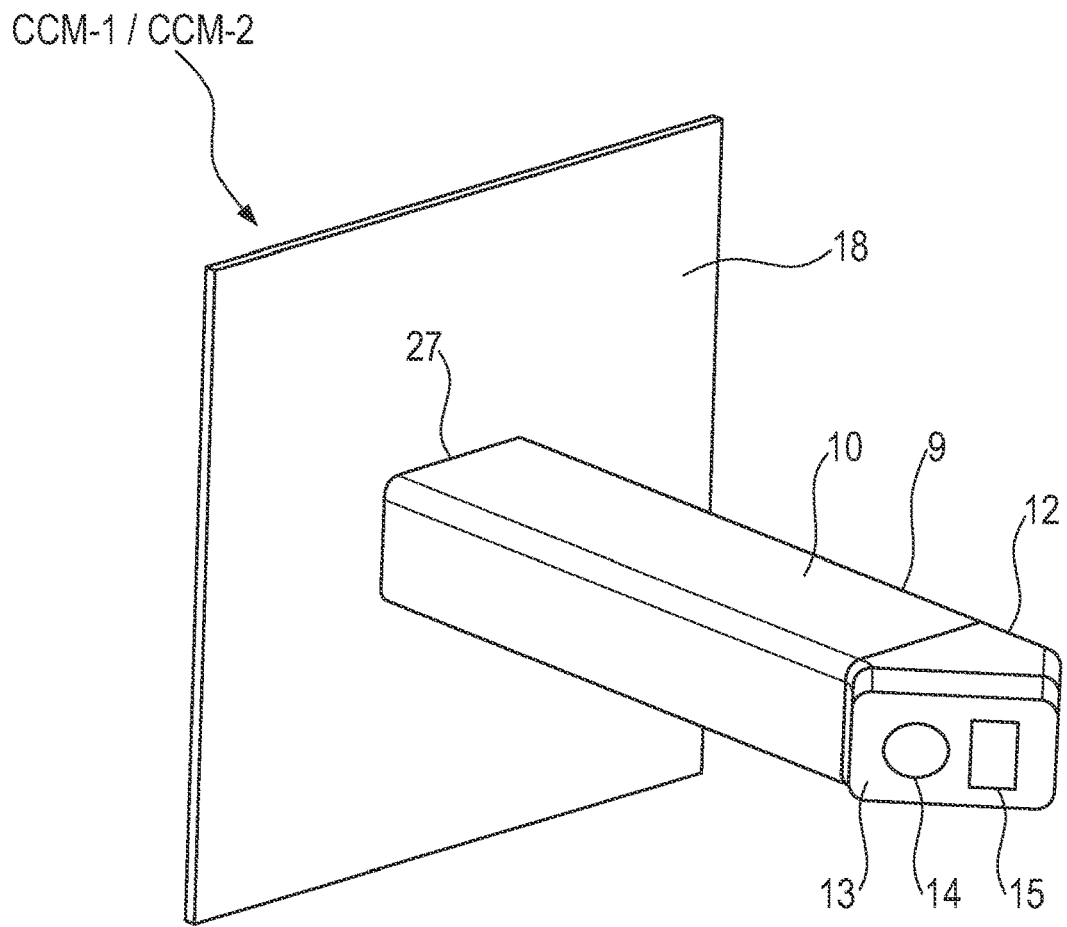
FIG. 10 is a perspective view of a door image recording module according to an exemplary structural configuration.
Figure 11:
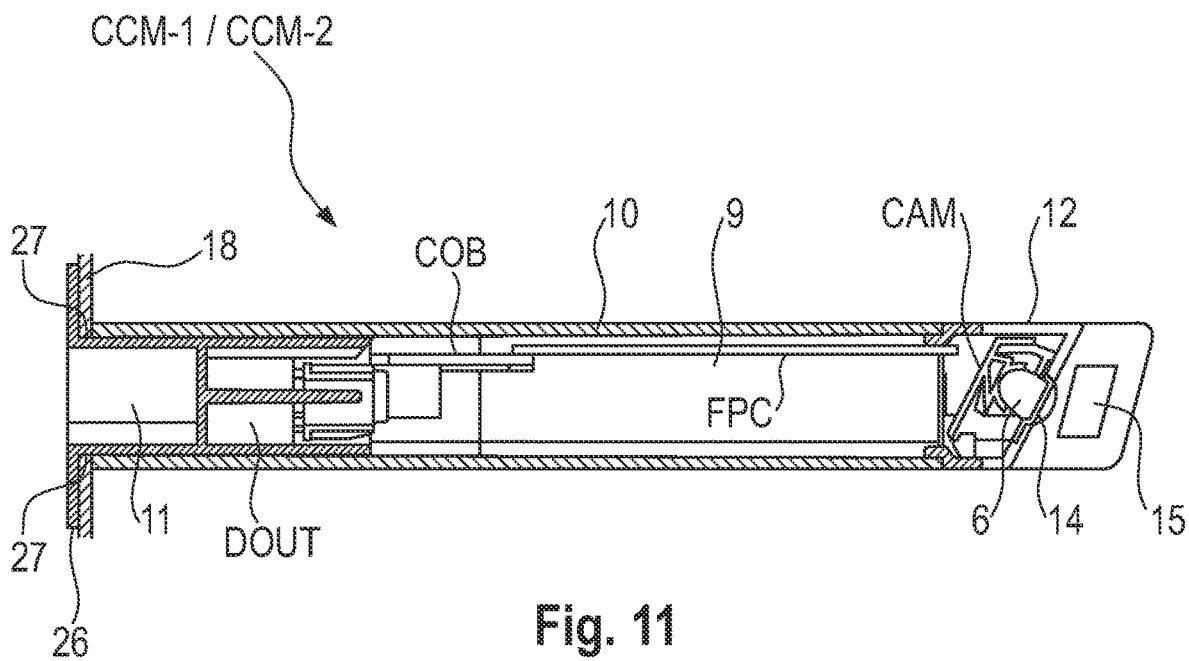
FIG. 11 is a longitudinal-sectional representation, viewed from the side, of the door image recording module of FIG. 10.

FIG. 10 shows an oblique view of a door image recording module CCM-1, CCM-2 according to a possible structural configuration. FIG. 11 shows a sectional representation, viewed from the side, of the door image recording module CCM-1, CCM-2.

The door image recording module CCM-1, CCM-2 has a middle part 9 with a tubular housing 10. A reinforcement part 11 having a laterally tapering, plate-shaped base 26 is inserted into the rear end opening of the housing 10. The reinforcement part 11 is pushed through a simple opening 27 in a door inner wall 18 into the cooling chamber 3 until the base 26 is fully supported on a side of the door inner wall 18 (which can also be referred to as the "door inner liner," see FIG. 12) facing away from the cooling chamber 3. In the installed state of the door image recording module CCM-1, CCM-2, the door inner wall 18 is clamped between the base 26 and the rear edge of the tubular housing 10 and, due to the surface contact between the base and the door inner wall 18, is aligned precisely with the door inner wall 18. In this case, the middle part 9 protrudes for example on the inner or cooling chamber side vertically in front of the door inner wall 18. The arrangement shown is advantageously particularly easy to implement and install, and can also be used on a cross-platform basis. Specifically, the reinforcement part 11 can also be used in a standardized manner across different platforms.

A cap 12 with an end face 13 is placed on the front end of the housing 10, wherein the end face 13 is angled obliquely to the longitudinal orientation of the tubular housing 10 and has a window 14 for the camera sensor 6 and a window 15 for the flash 7. The window 14 can be embodied as an optical element, for example as a lens. The window 14 can be heatable in order to prevent misting. The camera module CAM is accommodated in the cap 12 and connected to the connection module COB via an FPC connector FPC laid through the tubular housing 10. The signal transmission terminal DOUT is present at the rear opening of the housing 10.

A further advantage of the door image recording module CCM-1, CCM-2 is that it can be installed without screws.

Figure 12:
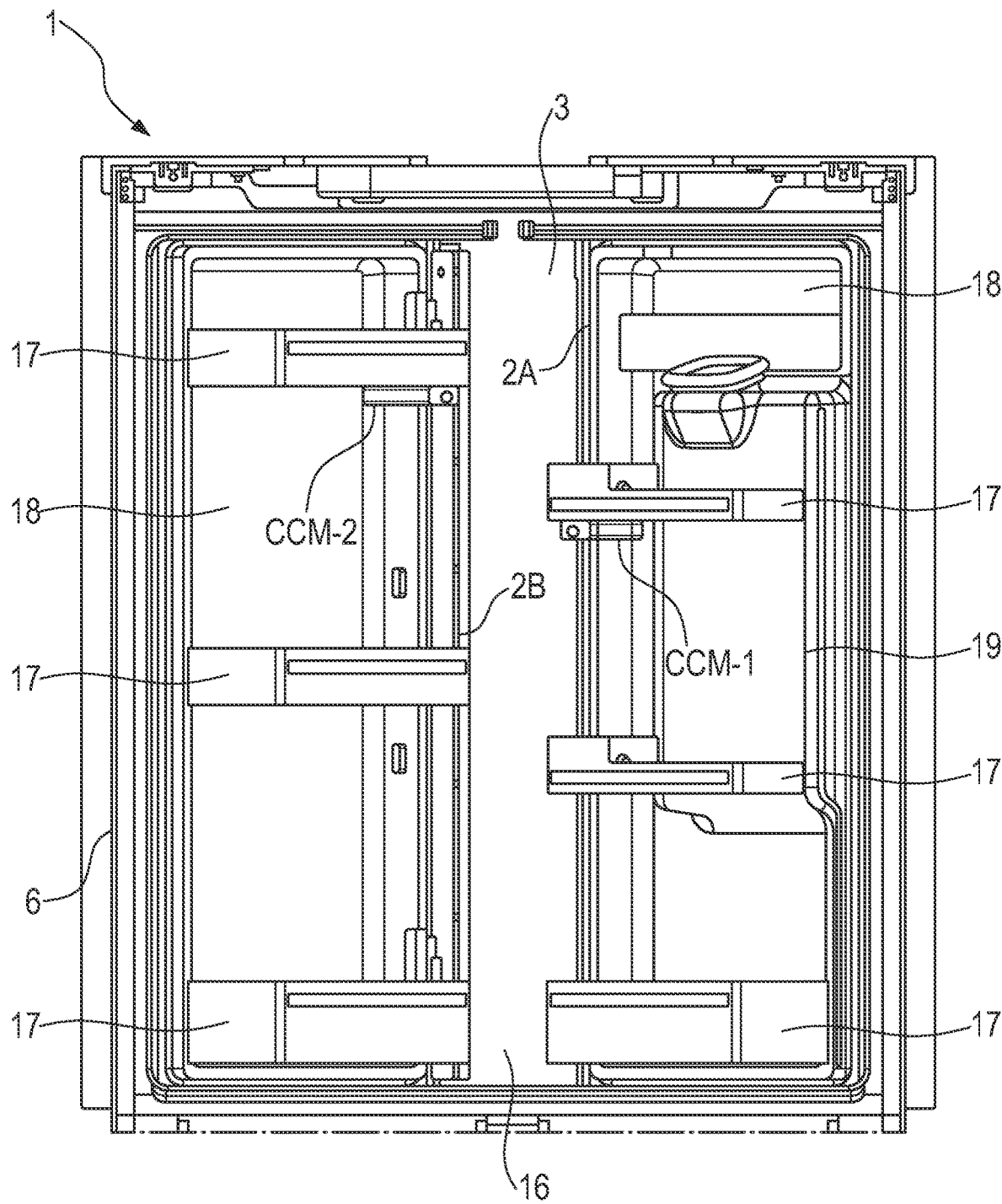
FIG. 12 is a sectional representation, viewed from the back from a cooling chamber, with both doors partially open.

FIG. 12 shows a sectional representation of the refrigerator 1 with the two doors 2A and 2B partially open, viewed from the back from the cooling chamber 3 through the front loading opening 16. Door compartments 17 are disposed in each case on the inner side of the doors 2A, 2B. An ice dispenser 19 is also located in the left door 2A in front of the door inner wall 18.

The door image recording modules CCM-1, CCM-2 project from an edge region adjacent to the hinges (not shown) out of the door inner wall 18 of the respective door 2A or 2B, namely at different heights, in each case just below a base of a door compartment 17 disposed thereabove. Because the end face 13 is positioned obliquely in the direction of the cooling chamber 3, a larger region of the cooling chamber 3 lies in the field of view of the camera sensors 6 than without the oblique position.

Figure 13:
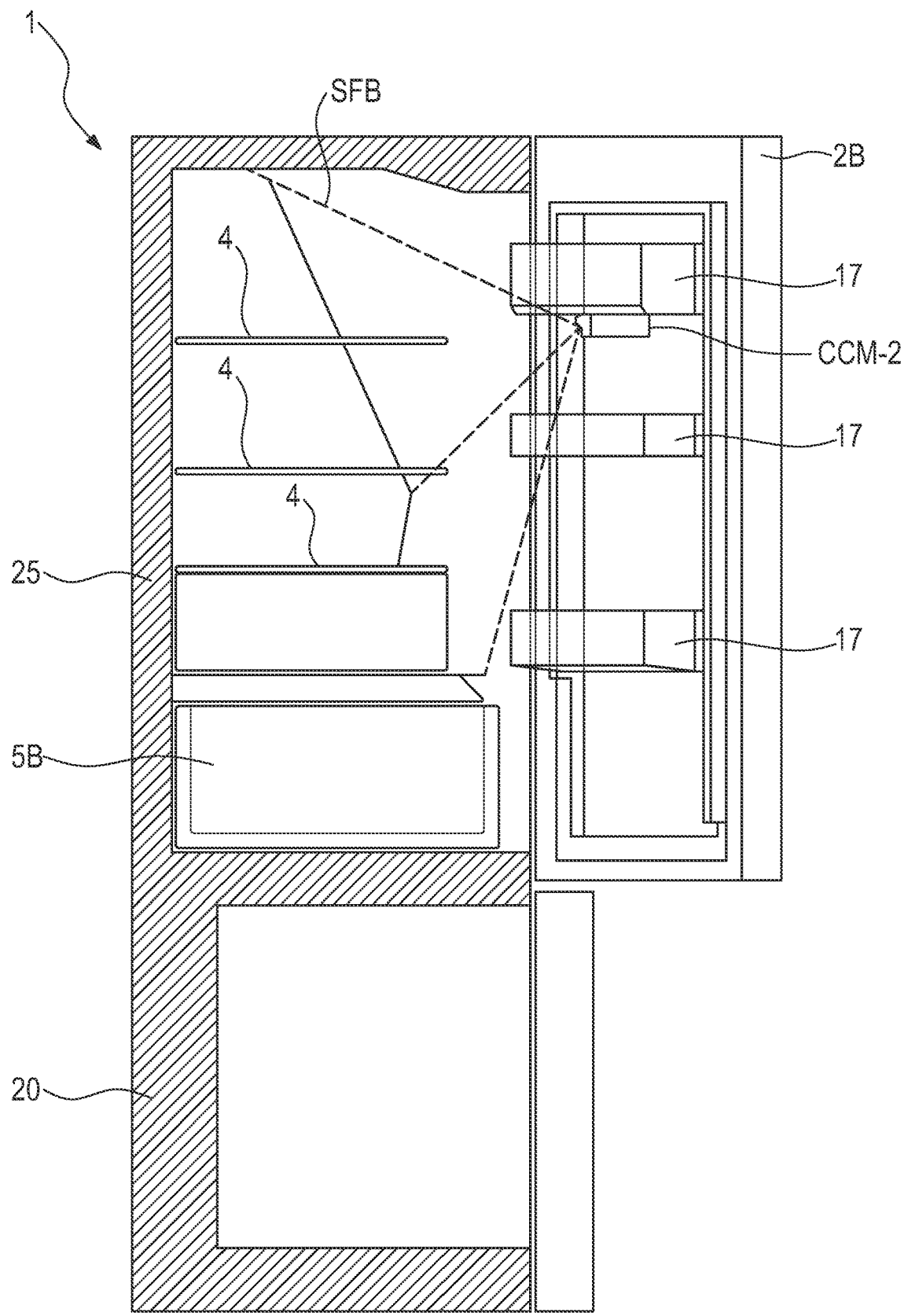
FIG. 13 is a sectional representation, viewed from the side, of the refrigerator.

FIG. 13 shows a sectional representation, viewed from the side, of the refrigerator 1, which is embodied in this case as a combination appliance with a freezer compartment 20 disposed therebelow. With the right door 2B opened at the first trigger angle/self-trigger xα1, the field of view SFB of the associated door image recording module CCM-2 is such that at least those spatial regions which are located behind the (closed) door 2B are located 4 within the field of view SF above the shelves 4. Analogously, with the left door 2A opened at the first trigger angle/self-trigger xα1, the field of view SF of the associated door image recording module CCM-1 is such that at least those spatial regions which are located behind the (closed) door 2A are located within the field of view SFA above the shelves 4.

Figure 14:
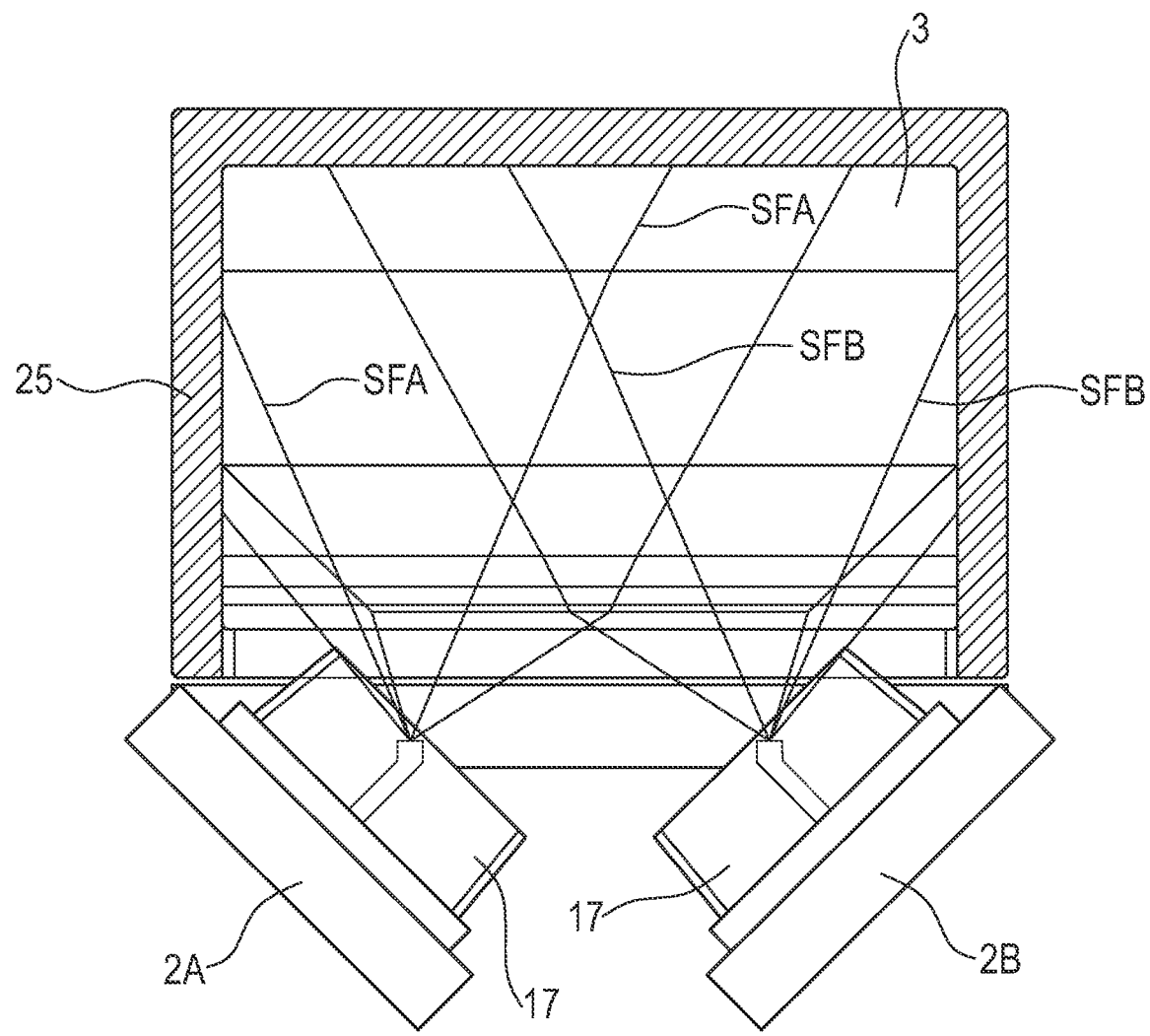
FIG. 14 is a sectional representation, viewed from above, of the refrigerator with fields of view of the door image recording modules.

FIG. 14 shows a sectional representation, viewed from above, of the refrigerator 1 with the fields of view SFA and SFB of the door image recording modules CCM-1 or CCM-2 of the doors 2A or 2B. The fields of view SFA and SFB overlap one another.

Naturally, the present invention is not restricted to the exemplary embodiment shown.

In general, "a," "an," etc. can be understood as singular or plural, in particular in the sense of "at least one" or "one or several," etc., provided this is not explicitly excluded, for example by the expression "exactly one," etc.

A numerical value can also include the given value as well as a typical tolerance range, provided this is not explicitly excluded.

The following is a summary list of reference numerals and the corresponding structure used in the above description of the invention.

LIST OF REFERENCE CHARACTERS

1 Double-door refrigerator
2A Left door
2B Right door
3 Cooling chamber
4 Shelf
5A Left drawer
5B Right drawer
6 Camera sensor
6A Sensor element of the camera sensor
7 Flash
8 Gyrosensor
9 Middle part
10 Tubular housing
11 Reinforcement part
12 Cap
13 End face
14 Window for the camera sensor
15 Window for the flash
16 Loading opening
17 Door compartment
18 Door inner wall
19 Ice dispenser
20 Freezer compartment
CAM Camera module
CCM-0 First image recording module
CCM-1 Second image recording module
CCM-2 Third image recording module
CCM-3 Fourth image recording module
CCM-n (n+1)th image recording module
CMM Central module
COAX Coaxial cable
COB Connection module
DESER Deserializer
DesVDD Supply voltage of the deserializer
DOUT Signal transmission terminal
FLASH Terminal for flash FPC FPC connector
FPD FPD terminal
FPD_x Interface for FPD Link III connection to image recording module CCM_x
GPIO Generally usable terminal ("General Purpose I/O")
I2C I2C terminal
MIPI-CSI MIPI-CSI terminal
mR-1 Proximity sensor assigned to the left drawer
mR-2 Proximity sensor assigned to the right drawer
RIN_x (x+1)th terminal of the deserializer to FPD_x
SER Serializer
SerVDD Supply voltage of the serializer
PoC Power supply/"Power over Coaxial"
SFA Field of view of the door image recording module CCM-1 of the left door
SFB Field of view of the door image recording module CCM-2 of the right door
SMM System master module
S1-1-S4-12 Method steps
TOS Door opening sensor
TRIGGER Trigger input
z Axis of rotation
α Pivot angle
Ωz Angular velocity

The invention claimed is:

1. A household refrigeration appliance, comprising:
a body and at least one door associated with said body;
a plurality of image recording modules each having at least one camera sensor;
a controller connected to said plurality of image recording modules;
said controller configured to output a trigger signal to at least one of said plurality of image recording modules; and
said at least one image recording module configured to record at least one image by using at least one camera sensor upon receiving the trigger signal and configured to transmit corresponding image data to said controller;
said plurality of image recording modules including at least one door image recording module disposed on a door and at least one body image recording module disposed on said body;
said at least one door image recording module having a gyrosensor and being configured to output a first trigger signal to at least one camera sensor of said at least one door image recording module upon at least one first trigger angle determined by said gyrosensor being reached by a corresponding door in order to record at least one associated image, and to transmit the associated image data to said controller.

2. The household refrigeration appliance according to claim 1, wherein:
said at least one door image recording module is configured to transmit a second trigger signal to said controller upon at least one second trigger angle determined by said gyrosensor being reached by said associated door; and
said controller configured to transmit the second trigger signal to said at least one body image recording module.

3. The household refrigeration appliance according to claim 2, wherein said at least one body image recording module for receiving the second trigger signal is configured to record at least one image of an inner side of said at least one door.

4. The household refrigeration appliance according to claim 1, which further comprises:
a cooling chamber and at least one drawer accommodated in said cooling chamber;
at least one sensor or proximity sensor associated with said at least one drawer and connected to said controller;
said controller configured to determine from sensor data of said at least one sensor or proximity sensor whether said at least one drawer is being pushed in and whether said at least one drawer is still open by a predetermined distance; and
upon said at least one drawer being pushed in and still being open by a predetermined distance, said controller configured to output a trigger signal to at least one body image recording module configured to record at least one image of said at least one open drawer.

5. The household refrigeration appliance according to claim 1, which further comprises at least one door, and at least one door opening sensor connected to said controller, said controller configured to deactivate at least one body image recording module upon said at least one door being closed.

6. The household refrigeration appliance according to claim 1, which further comprises:
a serial digital video interface or FPD Link III or GMSL connection connecting an image recording module to said controller;
said plurality of image recording modules each having a serializer configured to serialize at least image data to be transmitted to said controller; and
said controller having a deserializer configured to deserialize at least image data transmitted by said plurality of image recording modules.

7. A household refrigeration appliance, comprising:
a body and at least one door associated with said body;
a plurality of image recording modules each having at least one camera sensor;
a controller connected to said plurality of image recording modules;
said controller configured to output a trigger signal to at least one of said plurality of image recording modules;
said at least one image recording module configured to record at least one image by using at least one camera sensor upon receiving the trigger signal and configured to transmit corresponding image data to said controller;
said plurality of image recording modules including at least one door image recording module disposed on a door and at least one body image recording module disposed on said body:
said at least one door image recording module having a gyrosensor and being configured to output a first trigger signal to at least one camera sensor of said at least one door image recording module upon at least one first trigger angle determined by said gyrosensor being reached by a corresponding door in order to record at least one associated image, and to transmit the associated image data to said controller;
a serial digital video interface or FPD Link III or GMSL connection connecting an image recording module to said controller;
said plurality of image recording modules each having a serializer configured to serialize at least image data to be transmitted to said controller;
said controller having a deserializer configured to deserialize at least image data transmitted by said plurality of image recording modules;

at least one door opening sensor respectively associated with said at least one door, said door opening sensor connected to said controller;

said controller configured to transmit an opening state of said at least one door to at least one door image recording module; and said at least one door image recording module configured to deactivate an associated serializer upon said at least one door being closed and said gyrosensor upon a determination of said associated door being at least substantially at rest.

8. The household refrigeration appliance according to claim 7, wherein said at least one door image recording module is configured to activate a previously-deactivated associated serializer, when said gyrosensor establishes a perceptible movement of an associated door.

9. The household refrigeration appliance according to claim 6, which further comprises coaxial cables respectively connecting said plurality of image recording modules to said controller.

10. The household refrigeration appliance according to claim 7, wherein:

said plurality of image recording modules each have a camera module including a camera sensor;

a connection module includes said serializer; and an FPC connector connects said camera module to said connection module.

11. The household refrigeration appliance according to claim 10, wherein said connection module also includes said gyrosensor.

12. The household refrigeration appliance according to claim 10, wherein said camera module also includes a flash.

13. A method for recording images of refrigerated goods stored in a household refrigeration appliance having a body and at least one door associated with the body, the method comprising:

providing the household refrigeration appliance with a plurality of image recording modules each having at least one camera sensor, the plurality of image recording modules including at least one door image recording module disposed on a door and at least one body image recording module disposed on the body;

the at least one door image recording module having a gyrosensor and being configured to output a first trigger signal to at least one camera sensor of the at least one door image recording module upon at least one first trigger angle determined by the gyrosensor being reached by a corresponding door in order to record at least one associated image, and to transmit the associated image data to the controller;

providing the household refrigeration appliance with a controller connected to the image recording modules;

using the controller to output a trigger signal to at least one of the image recording modules;

using the at least one image recording module to record at least one image by using at least one camera sensor upon receiving the trigger signal; and using the at least one image recording module to transmit corresponding image data to the controller.

* * * * *